(12) United States Patent
Goren et al.

(10) Patent No.: US 10,249,209 B2
(45) Date of Patent: Apr. 2, 2019

(54) REAL-TIME PITCH DETECTION FOR CREATING, PRACTICING AND SHARING OF MUSICAL HARMONIES

(71) Applicant: Harmony Helper, LLC, Mount Laurel, NJ (US)

(72) Inventors: Andrew Goren, Mount Laurel, NJ (US); Michael Holroyd, Charlottesville, VA (US)

(73) Assignee: Harmony Helper, LLC, Mount Laurel, NJ (US)

(*) Notice: Subject to any disclaimer, the term of this patent is extended or adjusted under 35 U.S.C. 154(b) by 0 days.

(21) Appl. No.: 16/006,500

(22) Filed: Jun. 12, 2018

(65) Prior Publication Data

US 2018/0357990 A1 Dec. 13, 2018

Related U.S. Application Data

(60) Provisional application No. 62/518,433, filed on Jun. 12, 2017.

(51) Int. Cl.
| | |
|---|---|
| *G10H 1/02* | (2006.01) |
| *G10H 7/04* | (2006.01) |
| *G09B 15/00* | (2006.01) |
| *G10H 1/00* | (2006.01) |
| *G10H 1/38* | (2006.01) |

(52) U.S. Cl.
CPC ......... *G09B 15/009* (2013.01); *G10H 1/0008* (2013.01); *G10H 1/38* (2013.01); *G10H 2210/066* (2013.01); *G10H 2210/076* (2013.01); *G10H 2210/086* (2013.01); *G10H 2220/106* (2013.01); *G10H 2250/235* (2013.01)

(58) Field of Classification Search
CPC ..... G10H 2210/066; G10H 1/02; G10H 5/005
See application file for complete search history.

(56) References Cited

U.S. PATENT DOCUMENTS

| | | | |
|---|---|---|---|
| 4,479,416 A | 10/1984 | Clague | |
| 5,038,658 A | 8/1991 | Tsuruta et al. | |
| 6,725,108 B1* | 4/2004 | Hall | ......... G10G 7/00 381/56 |
| 6,836,761 B1* | 12/2004 | Kawashima | ......... G10L 13/033 704/258 |
| 6,856,923 B2* | 2/2005 | Jung | .................... G10H 1/0008 702/71 |
| 6,995,310 B1 | 2/2006 | Knapp et al. | |

(Continued)

*Primary Examiner* — Marlon T Fletcher
(74) *Attorney, Agent, or Firm* — Fox Rothschild LLP; Robert J. Sacco; Carol E. Thorstad-Forsyth

(57) ABSTRACT

Real-time pitch detection of voiced musical notes involves converting sound waves, produced by a voiced rendition of one or more musical notes, to a time domain electronic audio signal. The electronic audio signal is processed to determine a true pitch of the time domain electronic audio signal. True pitch information is displayed in real-time, concurrent with the voiced rendition of each musical note. A pitch indicator conveys to a user information concerning the true pitch which has been determined. The true pitch is determined by segmenting the electronic audio signal into a plurality of audio signal samples and applying a constant-Q transform. Additional processing steps are applied to reduce pitch detection errors.

17 Claims, 28 Drawing Sheets

(56) References Cited

U.S. PATENT DOCUMENTS

| | | | |
|---|---|---|---|
| 7,117,154 B2* | 10/2006 | Yoshioka | G10L 19/18 |
| | | | 704/258 |
| 7,164,076 B2 | 1/2007 | McHale et al. | |
| 7,273,978 B2 | 9/2007 | Uhle | |
| 7,598,447 B2 | 10/2009 | Walker, II et al. | |
| 7,619,155 B2 | 11/2009 | Teo et al. | |
| 7,806,759 B2 | 10/2010 | McHale et al. | |
| 8,008,566 B2 | 8/2011 | Walker, II et al. | |
| 8,017,854 B2 | 9/2011 | Foster et al. | |
| 8,093,484 B2 | 1/2012 | Walker, II et al. | |
| 8,682,653 B2* | 3/2014 | Salazar | G10H 1/366 |
| | | | 340/539.13 |
| 8,868,411 B2* | 10/2014 | Cook | G10H 1/366 |
| | | | 704/207 |
| 8,907,195 B1 | 12/2014 | Erol | |
| 9,852,742 B2 | 12/2017 | Cook et al. | |
| 2004/0159220 A1* | 8/2004 | Jung | G10L 25/90 |
| | | | 84/654 |
| 2005/0252362 A1 | 11/2005 | McHale et al. | |
| 2005/0255914 A1 | 11/2005 | McHale et al. | |
| 2006/0009979 A1 | 1/2006 | McHale et al. | |
| 2006/0075881 A1 | 4/2006 | Streitenberger et al. | |
| 2006/0107826 A1 | 5/2006 | Knapp et al. | |
| 2007/0256551 A1 | 11/2007 | Knapp et al. | |
| 2008/0223202 A1* | 9/2008 | Shi | G10H 1/383 |
| | | | 84/645 |
| 2008/0271592 A1 | 11/2008 | Beckford | |
| 2010/0300269 A1 | 12/2010 | Applewhite | |
| 2010/0300270 A1 | 12/2010 | Applewhite et al. | |
| 2010/0304810 A1 | 12/2010 | Stoddard | |
| 2010/0304811 A1 | 12/2010 | Schmidt et al. | |
| 2010/0304863 A1 | 12/2010 | Applewhite et al. | |
| 2011/0088534 A1 | 4/2011 | Takashima | |
| 2011/0251840 A1* | 10/2011 | Cook | G10H 1/366 |
| | | | 704/207 |
| 2011/0251842 A1 | 10/2011 | Cook et al. | |
| 2013/0025437 A1* | 1/2013 | Serletic | G10H 1/0025 |
| | | | 84/634 |
| 2013/0255477 A1 | 10/2013 | Ierymenko et al. | |
| 2014/0053711 A1* | 2/2014 | Serletic, II | G10H 1/38 |
| | | | 84/611 |
| 2014/0366710 A1* | 12/2014 | Eronen | G10H 1/00 |
| | | | 84/609 |
| 2015/0170636 A1 | 6/2015 | Cook et al. | |
| 2015/0262589 A1 | 9/2015 | Inoue et al. | |
| 2016/0005416 A1 | 1/2016 | Salazar et al. | |
| 2016/0042657 A1* | 2/2016 | Granger | G09B 15/023 |
| | | | 84/477 R |
| 2016/0071503 A1 | 3/2016 | Salazar et al. | |
| 2016/0196343 A1* | 7/2016 | Rafii | G06F 17/3033 |
| | | | 707/730 |
| 2017/0039276 A1 | 2/2017 | Rafii | |
| 2017/0148424 A1* | 5/2017 | Wang | G10G 1/00 |
| 2017/0194016 A1 | 7/2017 | Qi et al. | |
| 2017/0294196 A1 | 10/2017 | Bradley et al. | |
| 2017/0316769 A1 | 11/2017 | Ahmaniemi | |
| 2018/0014125 A1 | 1/2018 | You | |
| 2018/0018949 A1 | 1/2018 | Sullivan et al. | |
| 2018/0075866 A1 | 3/2018 | Tootill et al. | |
| 2018/0174596 A1 | 6/2018 | Cook et al. | |
| 2018/0190275 A1 | 7/2018 | Bhaya et al. | |
| 2018/0204584 A1 | 7/2018 | Cook et al. | |
| 2018/0357990 A1* | 12/2018 | Goren | G10H 1/38 |

\* cited by examiner

REAL-TIME PITCH DETECTION FOR CREATING, PRACTICING AND SHARING OF MUSICAL HARMONIES

CROSS-REFERENCE TO RELATED APPLICATION

This application claims priority to pending provisional U.S. Patent Application Ser. No. 62/518,433 filed on Jun. 12, 2017 which is hereby incorporated by reference in its entirety.

BACKGROUND

Statement of the Technical Field

This disclosure concerns music harmony, and more particularly concerns automated methods and devices which facilitate the creating, practicing and sharing of musical harmonies.

Description of the Related Art

In the music field, harmony involves a combination of concurrently sounded musical notes which produce a pleasant listening effect. In this regard, harmony is generally understood to require at least two separate tones or voices to be sounded simultaneously. For example, a simple form of harmony would involve a second note sounded at a pitch that is double the pitch of a basic melody. A Third harmony is one in which the harmony part is a musical Third above the original pitches comprising the melody. Most commonly, a musical harmony will comprise between three and six voice parts or tones.

In theory, various harmony parts (e.g. vocal harmony parts) could be created separately and then combined to create a song. But in order to create vocal harmonies that have a pleasing sound, vocalists will often work together with producers. For example, this process can take place in a recording studio with the various vocalists present so that they can practice with one another and hear how the combined vocal parts will sound when combined together.

SUMMARY

This document concerns a method for determining in real-time a pitch of voiced musical notes. A microphone is used to convert sound waves, produced by a voiced rendition of one or more musical notes, to a time domain electronic audio signal. The electronic audio signal is then processed in an electronic processing device to determine a true pitch of the time domain electronic audio signal. The electronic processing device displays in real-time, concurrent with the voiced rendition of each musical note, a pitch indicator on a display screen. The pitch indicators conveys to a user information concerning the true pitch which has been determined.

The true pitch is determined in the electronic processing device by applying a method for real-time pitch detection of a voiced audio signal. The method involves segmenting the electronic audio signal into a plurality of audio signal samples. Thereafter, a constant-Q transform is applied to each of the audio signal samples. The constant-Q transform of the audio signal sample produces a plurality of bins comprising frequency domain data. Each of the bins will have a defined frequency range and will have a specified power level. The power level for each bin will represent a detected power level of frequencies within the defined frequency range for that bin.

In a solution described herein, the constant-Q transform is advantageously implemented with a set of parameters which are specifically optimized for real-time detection of the pitch of a human voice. For example, a number of Fast Fourier Transform (FFT) bins per octave can be set to 48, a frequency to bandwidth ratio of a logarithmic filter used for the constant-Q transform can be set to a value between 250 and 300 Hz (e.g., 275 Hz), and a length of each audio signal sample can be selected to have a value in the range from 30 ms to 60 ms.

The method continues by evaluating the plurality of bins across a range of frequencies associated with a human voice. The variations in power level are evaluated over this range to identify one or more frequencies within the range where the power level assigned to the bins is determined to be at a local maxima relative to the bins comprising higher and lower frequencies. According to one aspect, the process of identifying one or more local peaks can involve evaluating the bin values associated with a particular audio signal sample from lowest to highest frequency in progression. This identifying process can further involve selecting only those local peaks defined by one or more bins which have a detected power level which exceeds a power magnitude of previously identified local peaks by at least a minimum predetermined threshold.

The method continues with certain operations which are designed to reduce potential octave errors caused by partial onsets and early onsets which are specifically associated with the human voice. These operations include the application of a corrective function which selectively adds energy to bins associated with certain ones of the local peaks. A frequency of the local peak having the largest power magnitude after the corrective function has been applied can then be selected as the true peak.

In a solution described above, the application of the corrective function can involve mathematically characterizing a distribution or shape of each of the one or more local peaks. The corrective function will then selectively add energy to a particular first one of the local peaks when the distribution or shape of a second local peak associated with a partial onset is determined to be similar to the energy distribution of the first local peak. The method can further involve using a bilateral filter to reduce common pitch tracking errors which occur at the beginning of voiced musical notes and around certain consonants when sung by a human.

In some scenarios, the one or more musical notes which are the subject of the real-time pitch detection process can comprise a first musical harmony part of a musical composition. In such a scenario, the method can further comprise causing the electronic processing device to display the one or more musical notes which are to be produced by the voiced rendition on a note grid. Further, the pitch indicator for each musical note of the first musical harmony part can be displayed on the note grid. In some scenarios, the musical composition can include at least a second musical harmony part. In such instances, the electronic processing device can be caused to further display on the note grid concurrent with the musical notes comprising the first musical harmony part, the musical notes which are associated with at least the second musical harmony part. Further, the second musical harmony part can be caused by the electronic processing device to be audibly played through a loudspeaker concurrent with the voiced rendition of the first harmony part.

According to a further aspect, the musical notes which specify the first musical harmony part can be automatically transcribed in at least a second electronic processing device. More particularly, the musical notes can be transcribed from a creative voice rendition of at least one of the first musical harmony part. Thereafter, a data result of the automatic transcribing can be imported into at least the first electronic processing device. The first and second electronic processing devices can be the same device or different devices.

The automatic transcribing operation is advantageously carried out using a note transcription algorithm. Significantly, the audio analysis operations applied by the note transcription algorithm can be distinct from audio analysis operations applied by the real-time pitch detection algorithm. For example, the note transcription algorithm can determines the musical notes by evaluating a shortest path through a graph network, instead of applying a constant-Q process as is used for real-time pitch detection. The use of two different types of audio analysis methods can be advantageous can in combination achieve improved results with respect to pitch detection in real time, and note transcription, even though the problems are similar in nature.

BRIEF DESCRIPTION OF THE DRAWINGS

The solution will be described with reference to the following drawing figures, in which like numerals represent like items throughout the figures, and in which.

DETAILED DESCRIPTION

Figure 1:
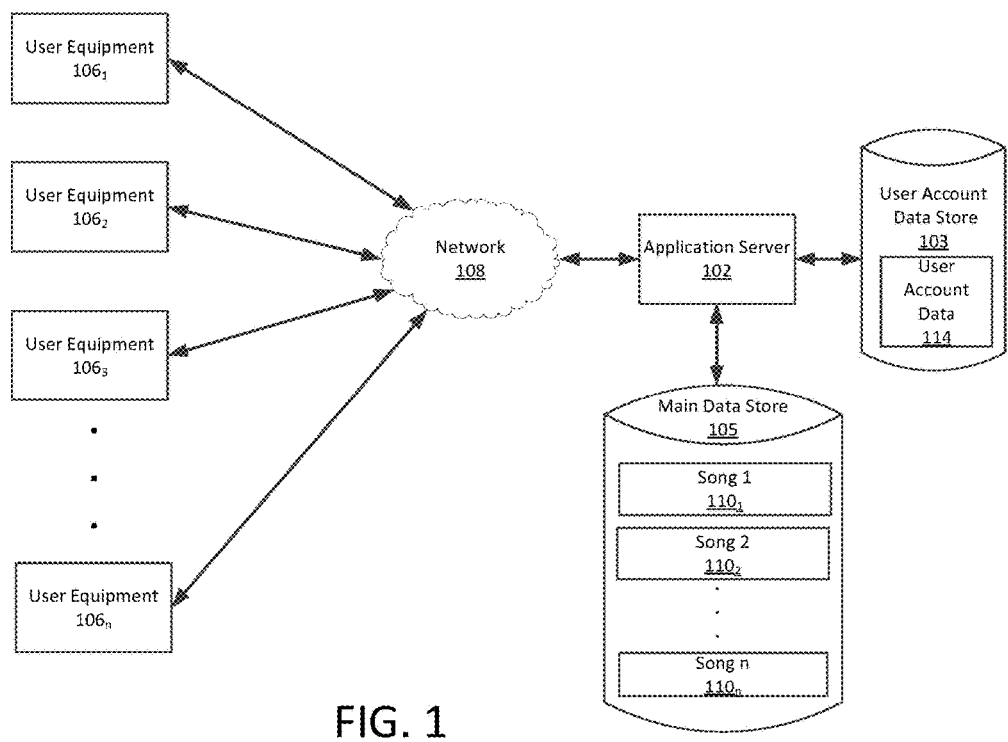
FIG. 1 is a conceptual diagram of a computer system that is useful for collaboratively creating, sharing and practicing musical harmonies.

It will be readily understood that the solution described herein and illustrated in the appended figures could involve a wide variety of different configurations. Thus, the following more detailed description, as represented in the figures, is not intended to limit the scope of the present disclosure, but is merely representative of certain implementations in various different scenarios. While the various aspects are presented in the drawings, the drawings are not necessarily drawn to scale unless specifically indicated.

A solution disclosed herein concerns a Music Harmony Tool (MHT) and method of using same. For a performer who seeks to learn, practice, share and/or collaboratively create harmonies there are a number of challenges which must be overcome. A harmony can involve a plurality of different parts in which performers are singing different notes at the same time. A singer seeking to create, learn or practice a harmony part must focus on the specific notes required for their part of the harmony without being distracted by other parts of the harmony. Further, different performers necessary for creating a harmony may be unavailable at the same time, may be physically separated by large distances and/or may have different skill levels requiring different amounts of practice time. Not all participants may want to participate in all practice sessions. But for singers with less experience, it can be difficult to master a particular harmony without the presence of others, and an inexperienced singer may not be able to tell when the harmony part they are singing is being performed properly. Accordingly, an MHT disclosed herein provides certain advantages for learning creating, practicing and collaborating in regards to musical harmonies.

Referring now to FIG. 1 it can be observed that an MHT system can in some scenarios include an application server 102 which has access to user account data store 103, and a main data store 105. One or more clients comprising user equipment (UE) computer systems $106_1$-$106_n$ can communicate with the application server using a computer data network 108. The UE computer systems $106_1$-$106_n$ can comprise any suitable type of computing device that is capable of carrying out the methods and functions described herein. In some scenarios, the user equipment can comprise a desktop computer with suitable network interface connections to carry out certain data communication operations as described herein. In other scenarios, the user equipment can comprise a portable data communication device such as a smart phone, a tablet computer, or a laptop computer. Other types of computing systems which can be used for this purpose include dedicated computing devices which are designed to exclusively carry out the methodologies and functions described herein. Although a network-based arrangement is presented herein, it should be understood that several aspects of the solution can also be implemented in a non-networked computer system. These various aspects and features are described below in greater detail.

The application server 102 can comprise a computer program and associated computer hardware that provides MHT services to the UE computer systems $106_1$-$106_n$ to assist in carrying out one or more of the methods and functions described herein. The user account data store 103 can contain certain user account data 114 pertaining to individual users who have established user accounts to facilitate access and use of the MHT. In some embodiments, the user account data store 103 can comprise user account data such as passwords, email addresses, practice session scores reflecting user proficiency, and so on. The user account data 114 can also include other types of user authentication data, digital certificates, and/or a transaction log. The main data store 105 can comprise music data files $110_1$, $110_2$, . . . $110_n$ associated with one or more songs. As described below in greater detail, each of the music data files $110_1, 110_2, \ldots 110_n$ can include digital data representative of one or more harmony parts created by one or more users.

The computer data network 108 is a comprised of a data communication network suitable to facilitate communication of data files, user data and other types of information necessary to implement the MHT and MHT services described herein. Computer network 108 can also facilitate sharing with UE computer systems $106_1$-$106_n$ certain computing resources that are available at application server 102. Exemplary networks which can be used for this purpose can include packet data networks operating in accordance with any communication protocol now known, or known in the future. The organizational scope of such network can include but is not limited to one or more of an intranet, an extranet, and the Internet.

Figure 2A:
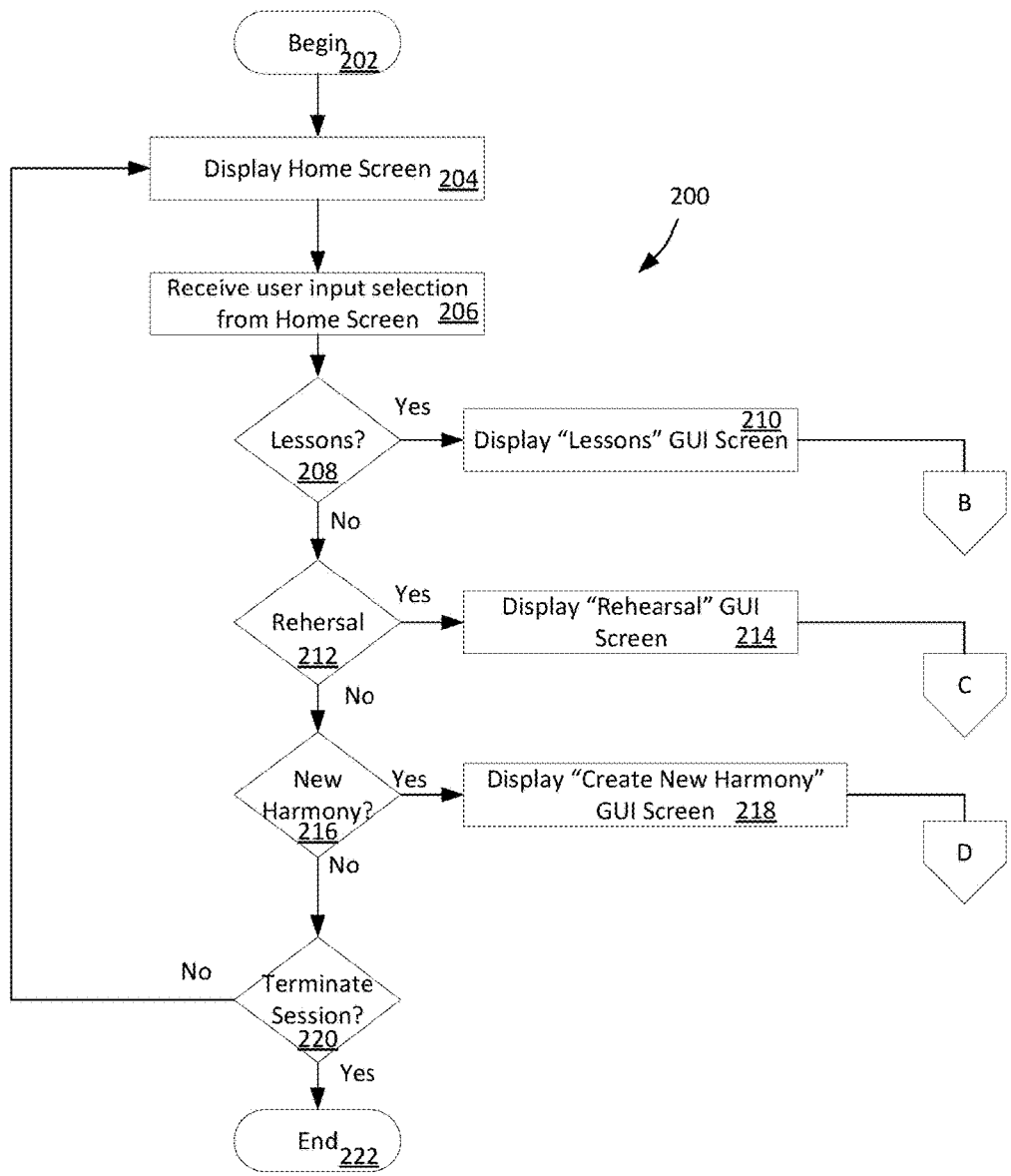
FIGS. 2A-2F comprise a set of flow charts that are useful for understanding a method for creating, sharing and practicing musical harmonies.

FIGS. 2A-2F comprise a set of flow charts that are useful for understanding a method for creating, sharing and practicing musical harmonies. FIG. 2A shows that an MHT process 200 can begin at 202 and continue at 204 where a graphical user interface (GUI) comprising a home screen is displayed on a display screen of a UE (e.g. any one of UE $106_1$-$106_n$). An example of a home screen 350 facilitated by a UE $106_1$-$106_n$ is shown in FIG. 3. The home screen 350 includes exemplary user selectable control elements 352, 354, 356, 358 which allow users to select various MHT functions such as "Rehearsal", "Lessons", "Build Harmonies" and "Create New Song". At least one other user selectable control element (e.g., control element 360) can facilitate user access to certain user data such as user account data 114. In some scenarios, the UE home screen can be presented on a display screen of a UE $106_1$-$106_n$. According to one aspect, the display screen can be a touch screen display though which a user can select available functions by touching one or more of the selectable control elements. In other scenarios, a computer pointing device, keyboard or other type of user interface can be provided for this purpose.

From the home screen a UE $106_1$-$106_n$ receive one or more user input selections 206. The process continues in steps 208, 212, 216 and 220 where a determination is made as to whether the user has selected a particular option. For example, selections can include a "Lessons" session option 208, a Rehearsal session option 212, or a Build Harmony session option 216. A user can also select a terminate session option 220. Depending on the user selection, the UE will transition to display the Lessons GUI at 210, a Rehearsal GUI at 214, or a Build Harmony GUI at 218 to begin the selected session as shown.

Figure 2B:
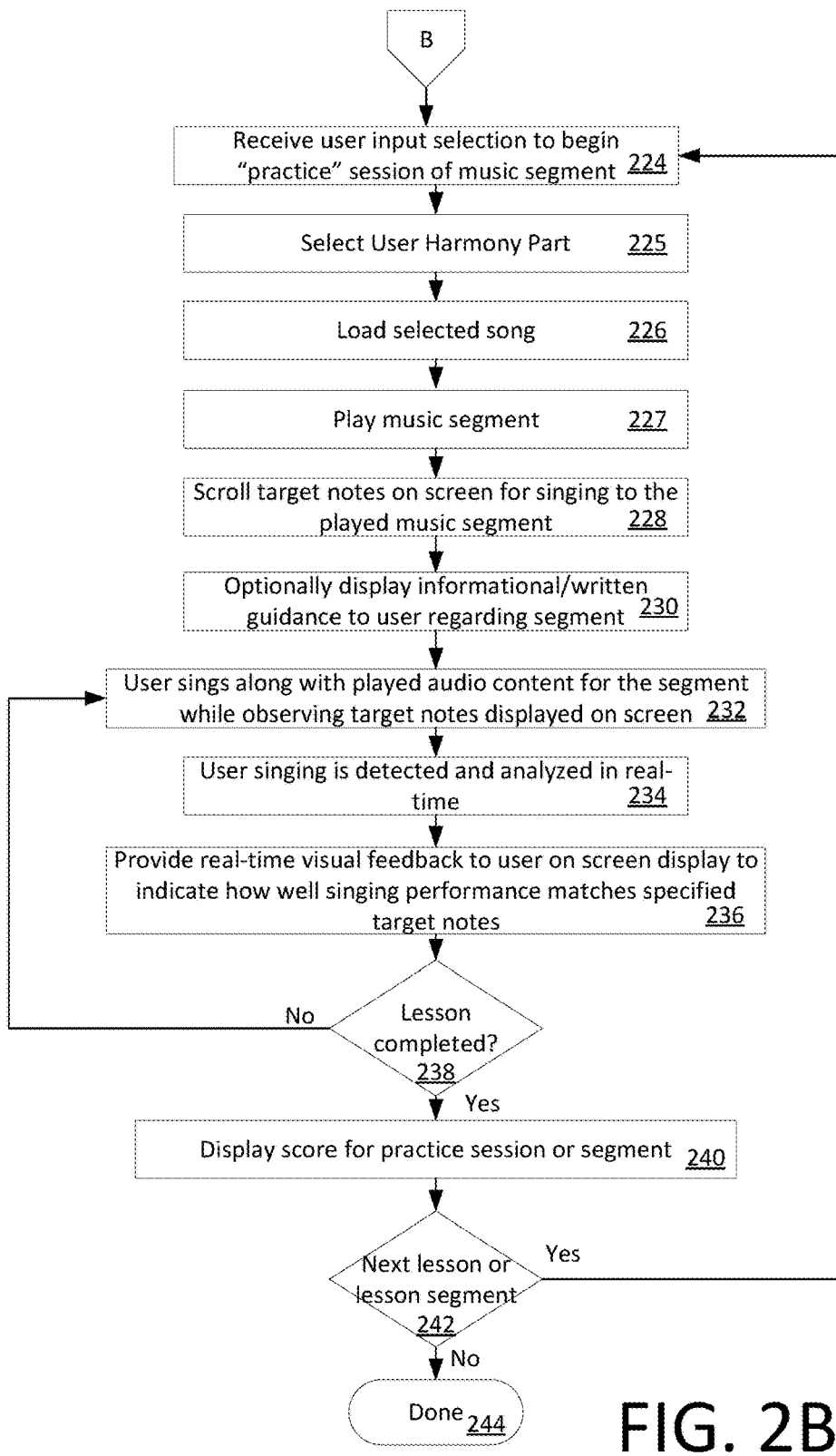
Figure 3:
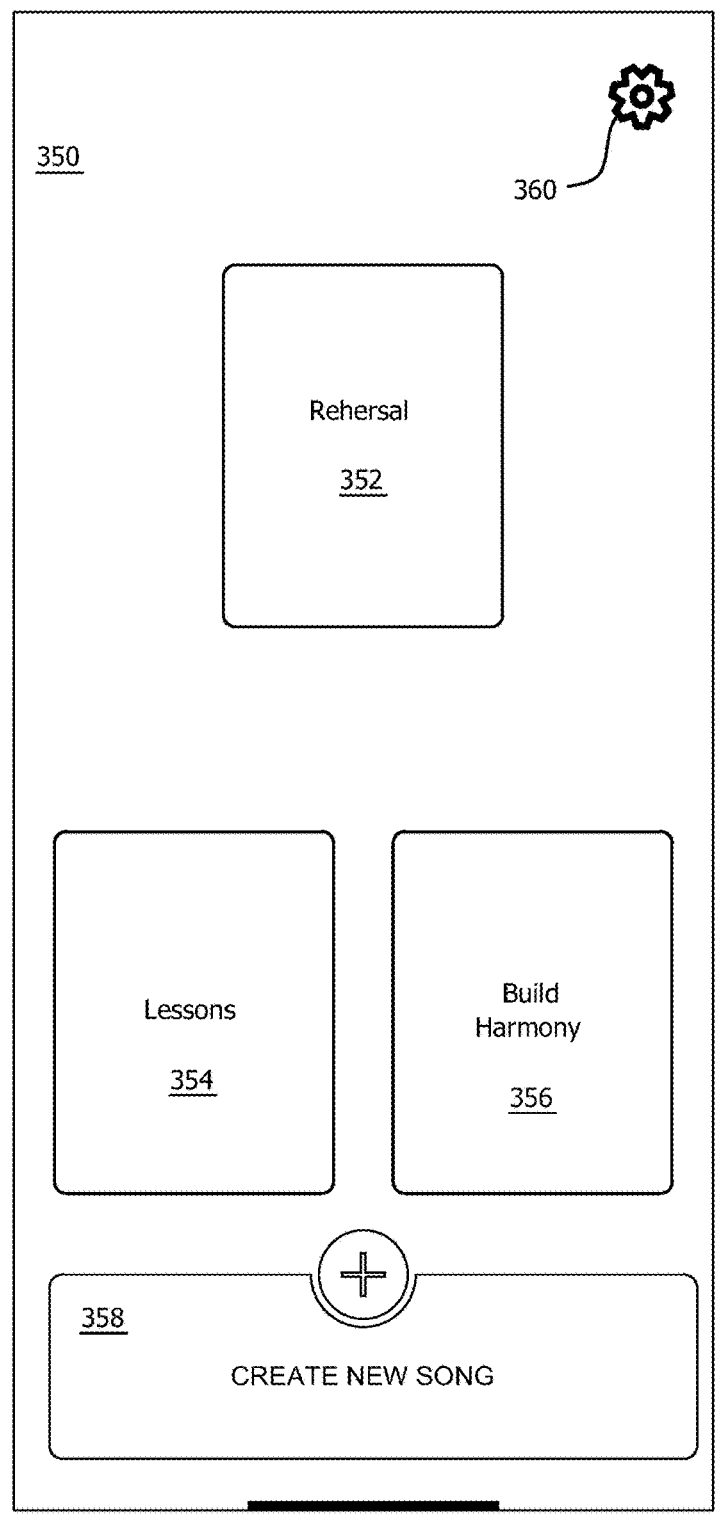
FIGS. 3 is a drawing which is useful for understanding a home screen through which a user can interact with a user equipment to facilitate collaborative creation, sharing and practicing of musical harmonies.
Figure 4A:
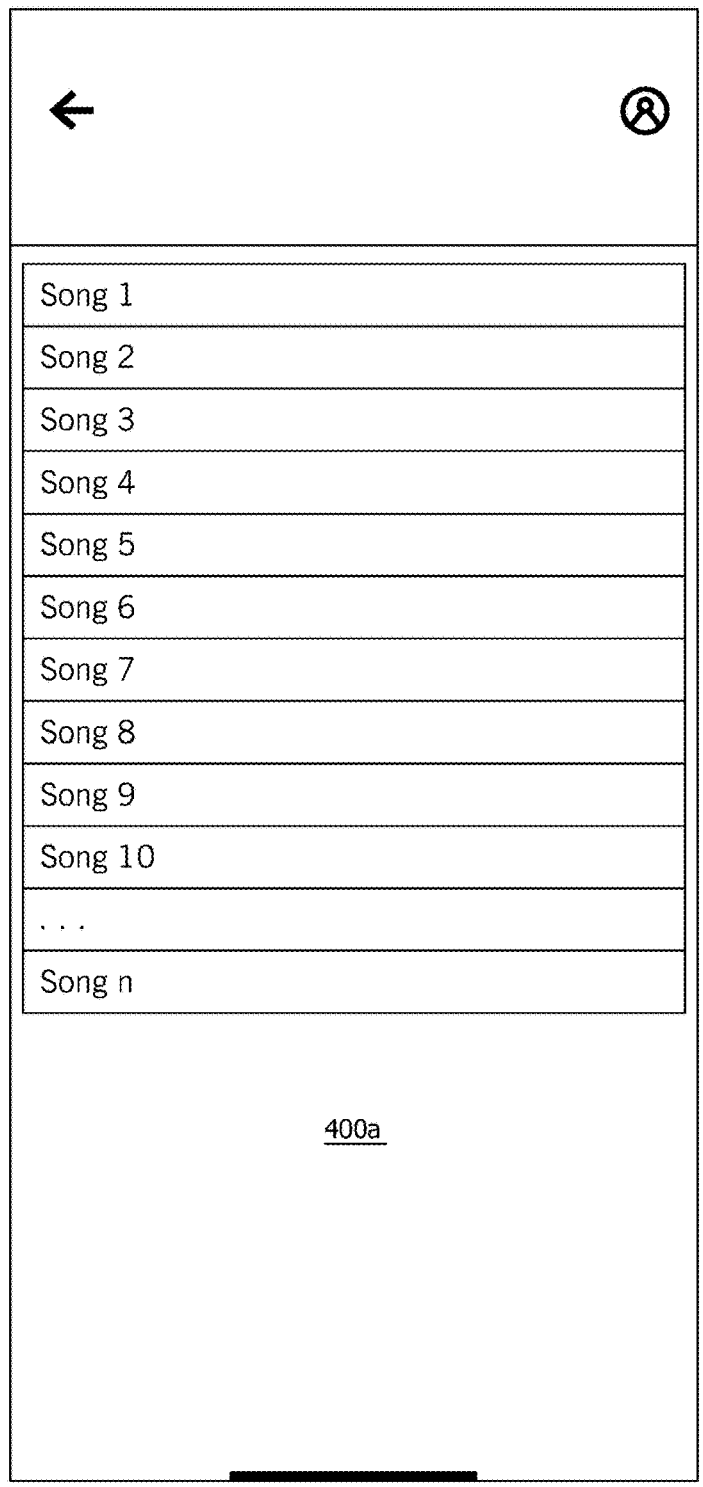
FIGS. 4A-4E are a series of drawings that are useful for understanding how a user can interact with the user equipment to facilitate a lesson session.

If a lesson session option is selected at 208, then the process continues at 224 in FIG. 2B. At 224, the UE receives a user input selection to begin a practice session with respect to a particular segment of a musical selection or song. The user's choice of a particular song can be entered in a song selection screen 400a as shown in FIG. 4A. In response to a user selection of a particular song (e.g., Song 3), the UE $106_1 \ldots 106_n$ can retrieve certain data comprising a particular segment of a musical selection or song. For example, in some scenarios the data comprising a segment of a particular musical selection or song $110_1$-$110_n$ can be retrieved from the main data store 105 in response to a request from a UE directed to the application server 102. In some scenarios, the segment can comprise the entire musical selection or song. In other scenarios the segment can comprise a portion of the musical selection.

Figure 4B:
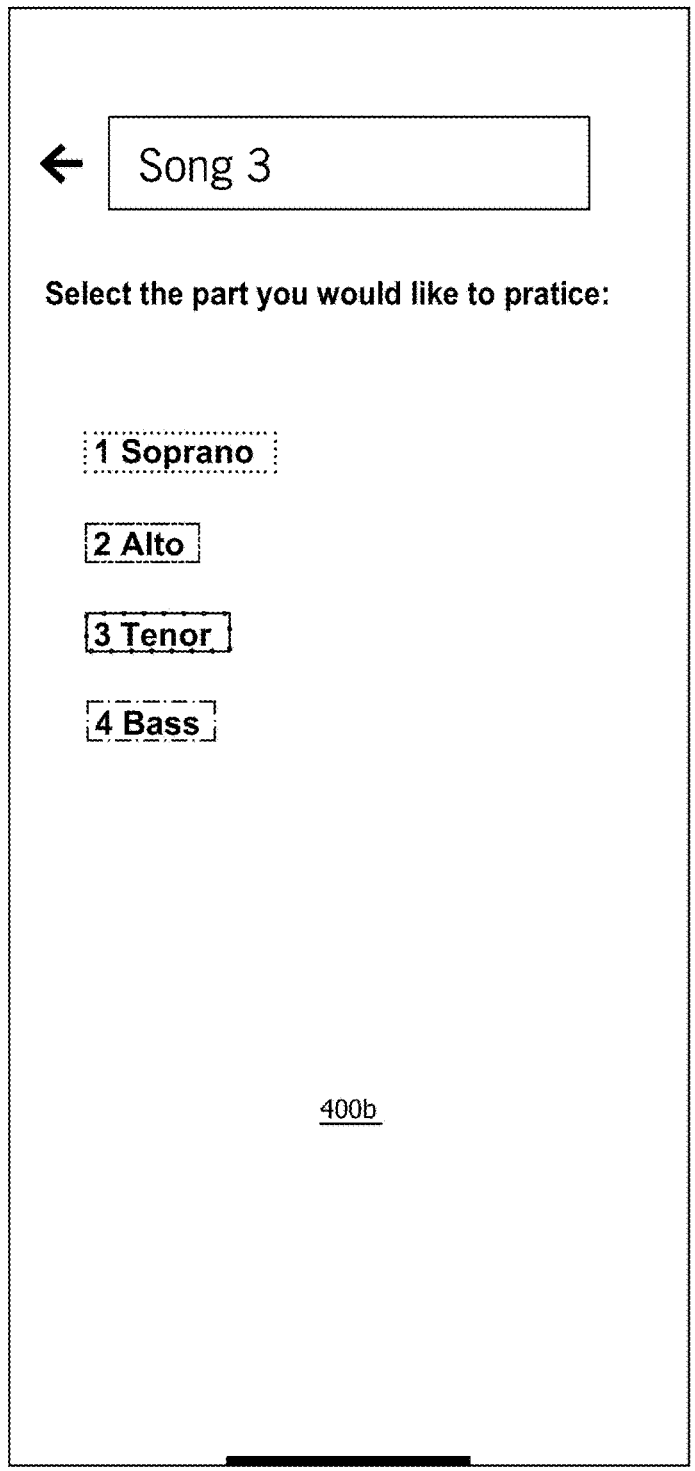

Once the particular song has been selected, the process continues on to 225 where the user can select a particular harmony part that he wishes to sing. For example, in a scenario shown in FIG. 4B the user can select the part of Soprano, Alto, Tenor or Bass from a part selection screen 400b. In some scenarios, the text associated with each identified part can be visually coded in accordance with a pattern or color. Once the system receives the user selection of a particular part that the user wishes to practice, the process continues on to 226 where selected song is loaded in preparation for the practice session. This condition is illustrated in FIG. 4C which involves a graphic display 400c of a musical note scale in which particular musical note legends or annotations 410 are aligned along a vertical note axis 411 of the display.

Figure 4C:
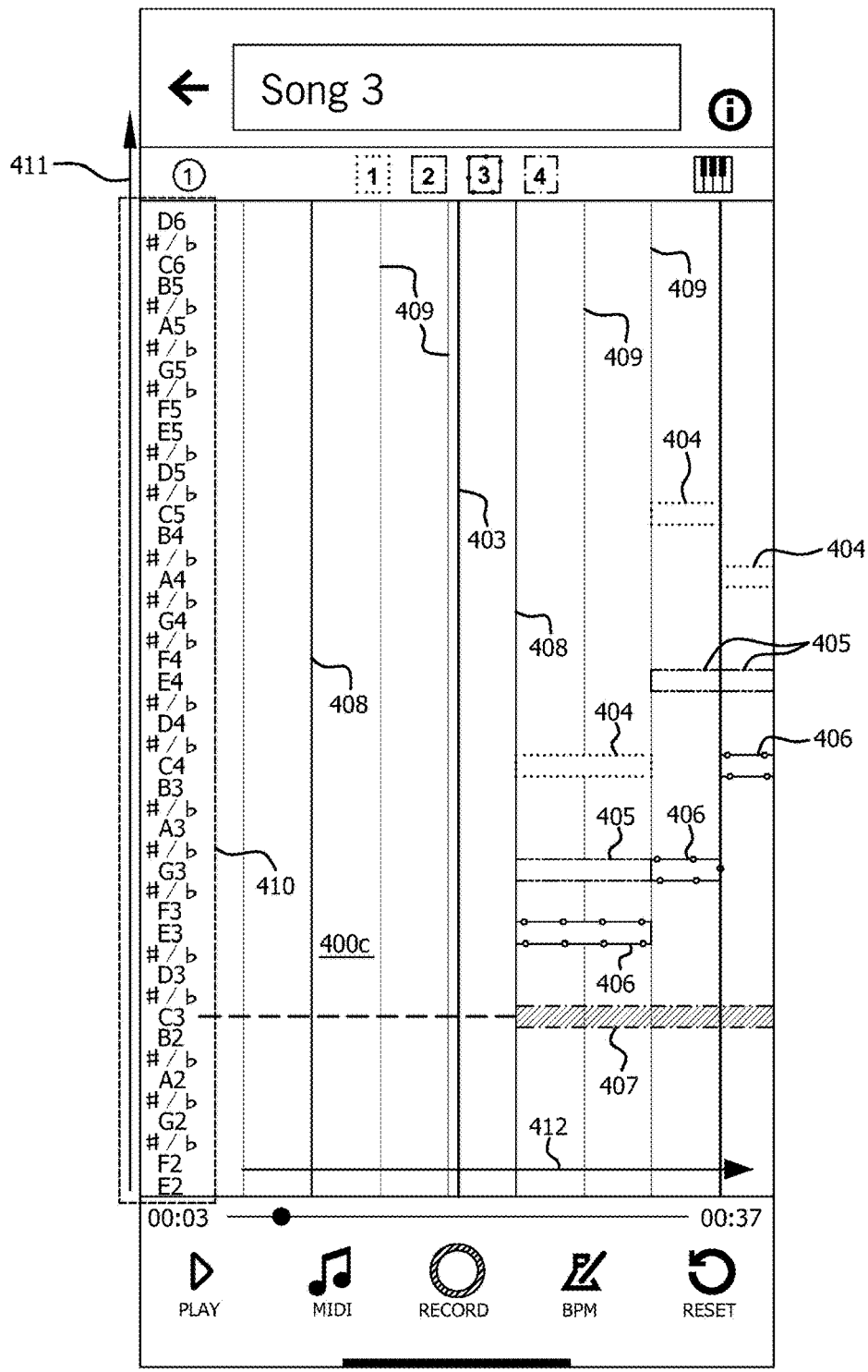

In FIG. 4C, each musical note block 404, 405, 406, 407 is visually coded by means of a selected visual indicator such as a cross-hatching pattern or color. In some scenarios, the pattern or color of the musical note blocks associated with a particular harmony part can be chosen to correspond with a visual coding (e.g., color or pattern) of one of the various harmony parts listed in FIG. 4B. For example, if text specifying the "Soprano" part is presented in blue colored text in FIG. 4B, then the musical note blocks 404 which correspond to the Soprano part in FIG. 4C can be presented in the same color blue. If text specifying the "Alto" part is presented in red colored text in FIG. 4B, then the musical note blocks 405 which correspond to the Alto part in FIG. 4C can be presented in the same color red. Consequently, the user can more easily identify through such visual coding which notes are associated with each part.

It can be observed in FIG. 4C that the musical note blocks 407 which correspond to the particular harmony part selected by the user can be highlighted or otherwise marked to facilitate identification. These marked musical note blocks are sometimes referred to herein as target musical note blocks. Once the practice session begins, the user is intended to sing these highlighted or visually marked target musical note blocks.

It can be observed in FIG. 4C that each musical note block 404, 405, 406, 407 is vertically aligned with the appropriate annotated note text in note legend 410. The musical note blocks are also aligned along the time axis 412 with a particular time during the particular musical segment of the selected song. For example, in FIG. 4C target musical note block 407 aligned with a particular time within a song to indicate the note that is required at a particular time for that particular harmony part. The duration of each note in the musical harmony is indicated by the width W of each note block along a direction aligned with time axis 412. Time scale is marked by vertical lines 408, 409 which extend transverse to the time axis. For example, lines 408 can indicate musical measures or bars, and lines 409 indicate beats within each measure. A current time axis 403 can specify the point in time where the user is intended to begin singing.

When the practice session actually begins, the measures and musical note blocks 404, 405, 406, 407 will automatically begin to move or scroll (e.g., from left to right) on the screen in accordance with the music tempo and the passage of time. In this regard, the musical note blocks can be said to scroll in a direction aligned with the time axis. More generally, the user's view into the note grid can be understood as being allowed to slide as the song progresses so that a "window" appears to the user to scroll along the time axis 412. The resulting note grid which is displayed can be advantageously centered in the display on the current time axis 403 within a particular song the user is practicing. This process is described below in greater detail.

Figure 4D:
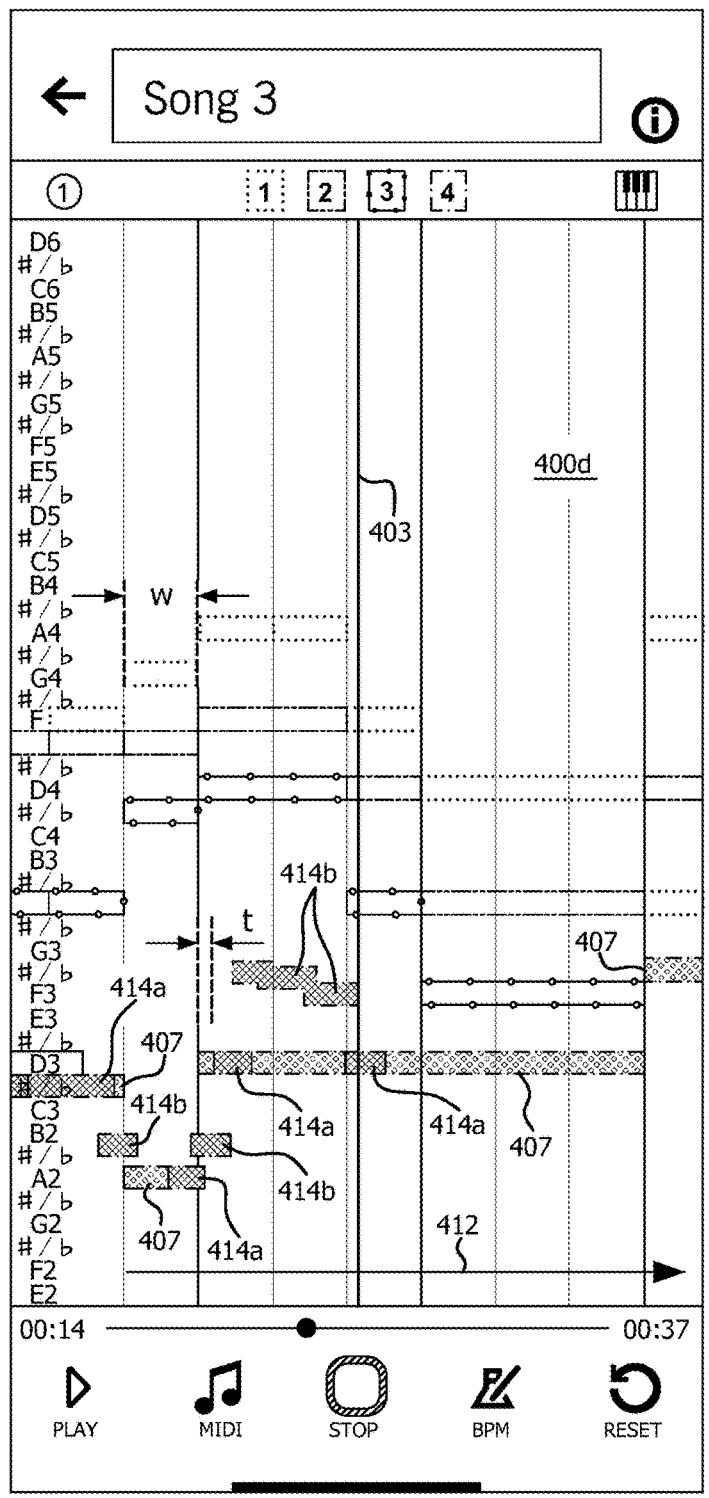
Figure 4E:
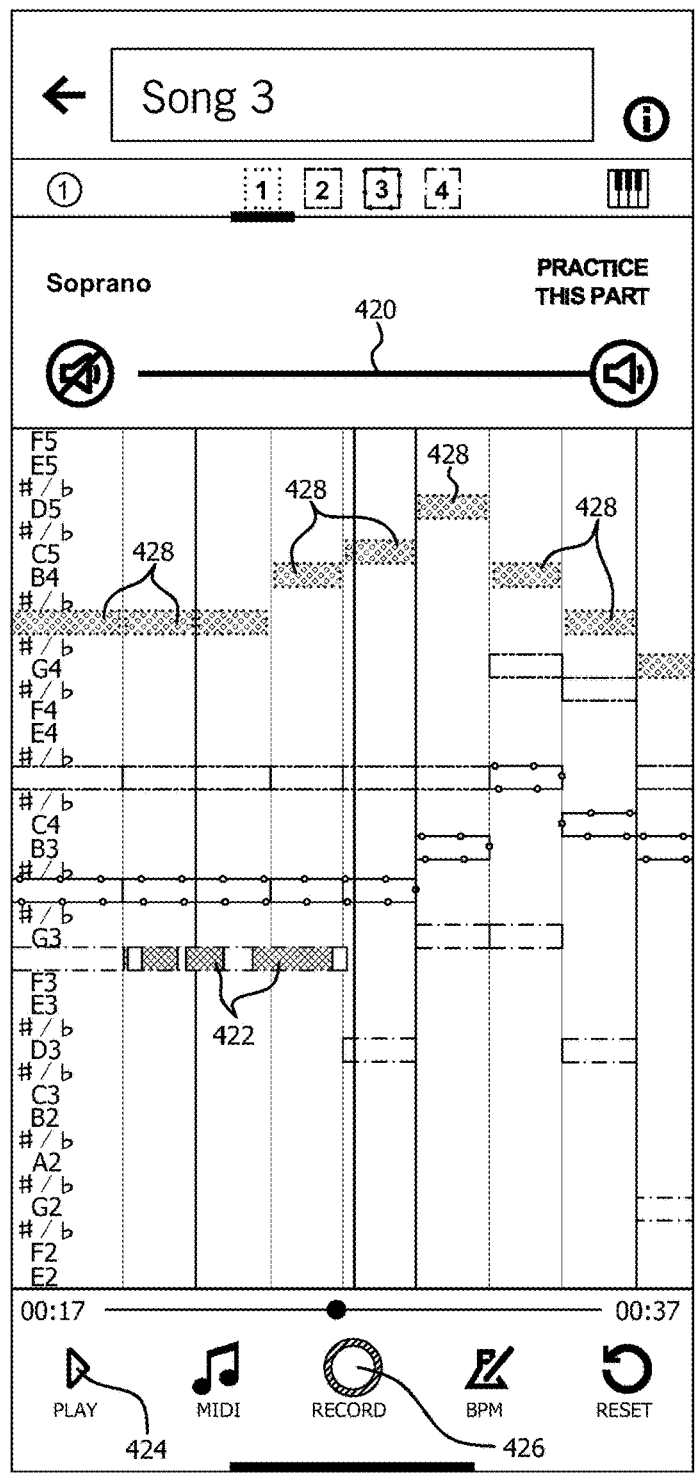

The practice session actually begins at 227 and 228 with the UE audibly reproducing the music segment, and also scrolling the music note blocks on the display screen. The scrolled notes will include the target musical note blocks 407 which the user is expected to sing with respect to the reproduced segment of music. FIG. 4D shows a display screen 400d corresponding to steps 227 and 228. Optionally, the process can further comprise displaying 230 to the user certain information or textual guidance (not shown in FIG. 4D) explaining how the particular segment is to be performed or sung.

At 232 a user will sing notes having a pitch in accordance with the target musical note blocks 408, while observing the target musical note blocks 408 which are scrolled on screen on screen with the passage of time. Using the contextual information provided in steps 227, 228 and 230, the user attempts while singing to match the pitch of their voice to the note that is specified by the target musical note blocks. As the user sings, the UE captures the resulting sound associated with such singing with a microphone so as to generate an audio signal. The UE further performs certain processing operations at 234 to analyze the pitch of the musical notes that are sung. The results of such analysis are displayed on screen at 236 in the form of visual cues 414a, 414b so that the user can understand how well the singing performance pitch is matching the specified target notes. These visual cues are presented or displayed to the user. In some scenarios, the visual cues can be presented in the form of micro-notes, having a duration which is substantially less than a duration of an entire measure. For example, in some scenarios each micro-note can be one musical beat or less. Micro-notes are selected to have a relatively short duration relative to each measure so as to facilitate continually updating the information presented to the user regarding the pitch that they are singing. It can be observed in FIG. 4D that the visual cues 414a, 414b are displayed in real time at a location along the time axis 412 to indicate actual timing of sung notes. Of course other types of visual cues are also possible and it should be appreciated that any such alternative arrangement of visual cue can also be acceptable for purposes of the solution presented herein.

FIG. 4D shows how the time-aligned visual cues are generated and displayed in real time as the user sings. In the example shown, visual cues 414a have the correct pitch corresponding to target musical note blocks 407. As such, visual cues 414a are displayed directly overlaid on the target musical note blocks 407. Conversely, visual cues 414b have the incorrect pitch as compared to the target musical note blocks 407 and therefore appear above or below the target musical note blocks 407 to indicate that the sung pitch is too high or too low.

In the scenario shown in FIG. 4D, notes 407 that are about to be sung enter from the right side of the screen and are intended to be voiced by the user as they scroll past the current time axis 403. The notes then depart the screen to the left. Visual cues regarding a timing of the user's singing can be provided by observing how well the leading and trailing edges of a particular visual cue 414a, 414b align with the position of the target musical note blocks 407 along the time axis 412. For example, in FIG. 4D a timing misalignment "t" between the leading edge of a target musical note block 407 and the leading edge of a visual cue 414a indicates that the user was late in beginning to sing the particular note. The foregoing visual cues can be visually observed and compared by a user in real-time to target musical note blocks 407.

The visual cues shown in FIG. 4D are useful for conveying information concerning the timing and pitch of musical notes to be voiced by the user. In some scenarios, it can be desirable to modify the visual cues to also convey information concerning the relative loudness of the harmony part that is to be sung. This additional information can be visually conveyed in any suitable manner. For example, in some scenarios the information can be conveyed by adjusting the "thickness/height" of the target musical note blocks 407 in the vertical direction (i.e., in directions aligned with the vertical note axis 411). Thicker/taller notes would indicate notes to be sung more loudly (forte), and narrower/skinnier notes would indicate quieter (piano) sections. Of course other variations are also possible. For example, the saturation, brightness or intensity of the displayed note blocks could be varied to indicated differences in how loud the musical note blocks are to be voiced. In other scenarios, the color of the musical note blocks can be varied.

The visual feedback provided to a user by the UE during practice gives real-time input to the singer. This feature greatly helps with training and improving vocals. For example, it eliminates the need for a user to record an entire track then go back and listen to it afterward. Accordingly, a user can avoid the slow and tedious feedback process common to conventional methods.

At 238 a determination is made as to whether the lesson corresponding to the particular segment is completed. If not (238: No) then the process returns to step 232 where the user continues to sing and receive feedback from the UE. If the lesson is completed with respect to the particular segment (238: Yes) then the process continues on to 240 where the UE can calculate and display a score with respect to the particular practice session. In some scenarios, this score can be used to help guide the user toward appropriate exercises or further practice sessions that are automatically selected to help the user improve his performance. For example, in some scenarios, the score provided to the user can be segmented to reveal performance associated with different portions of a harmony. In such a scenario, the user can be directed to those areas where the users performance is less than satisfactory. In other scenarios, where the user's score reveals a more generalized weakness in their singing ability, then the system can select musical singing exercises which are particularly tailored to improve certain singing skills.

At 242, the user can select whether to proceed with the next lessor or music segment. If so (242: Yes) then the process returns to 224 for practicing the next segment. Otherwise the process can terminate or return to the home screen at 244.

Figure 2C:
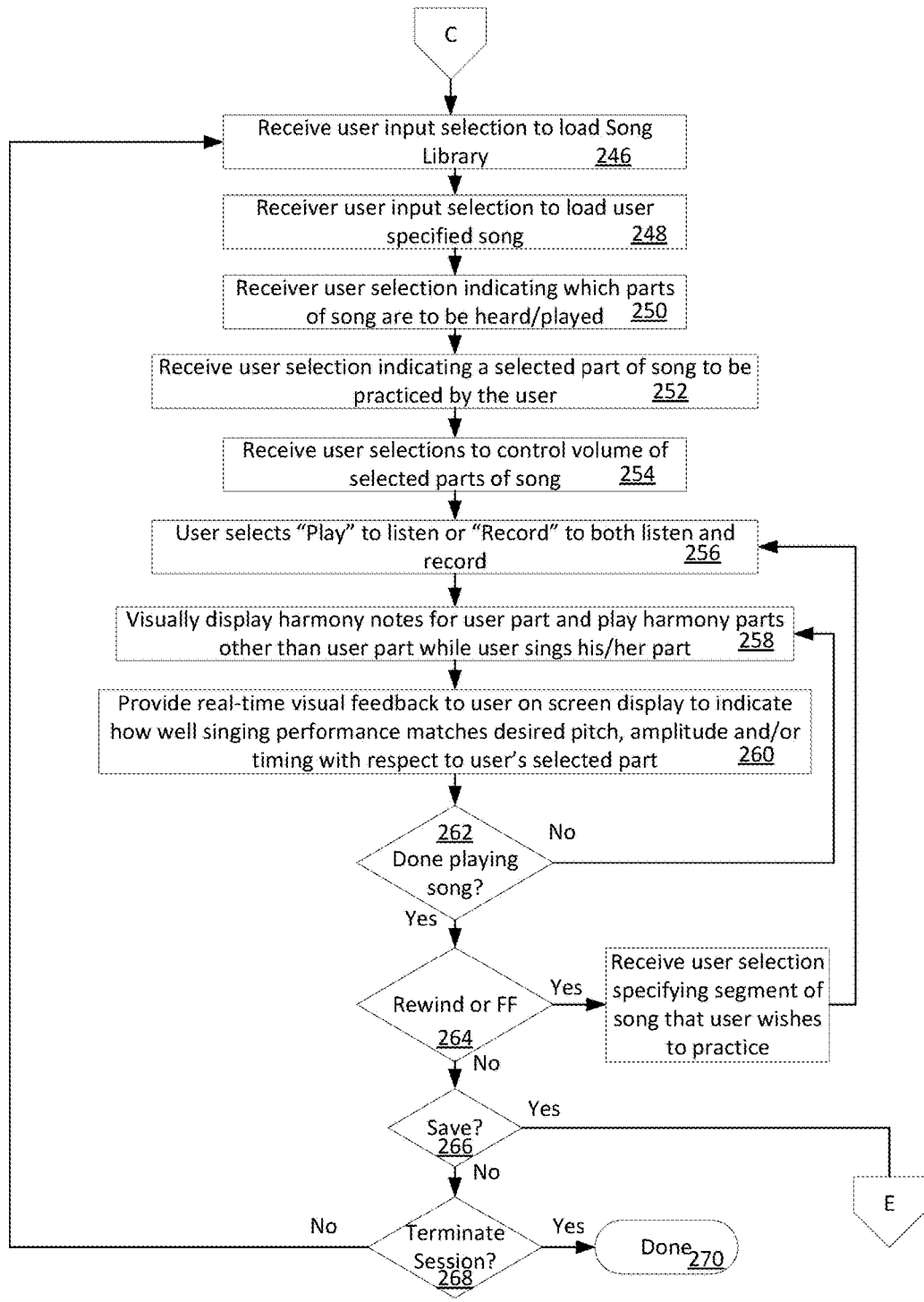

Referring once again to FIG. 2A, If a rehearsal session option is selected at 212, then the process continues at 246 in FIG. 2C. At 246 the UE receives a user input selection to load a Song Library. For example, this song library can be requested from an application server 102. Information concerning the selected Song Library can be displayed to the user in a screen similar to screen 400a as shown in FIG. 4A. Once the Song Library is loaded, the user can interact with the GUI to subsequently select at 248 a particular song for rehearsal.

The user can optionally begin the rehearsal by selecting a particular harmony part (first harmony part) of the song which has been loaded so that it can be played out loud using a UE loudspeaker. Accordingly, the process can continue at 250 with the UE receiving a user input specifying a particular harmony part which is to be played out loud. Shown in FIG. 2E is a display screen illustrating how the user can interact with the UE to facilitate such playback. Here, the user has previously selected Song 3 from the music library and has selected to play out loud the Soprano part. The UE can receive a user input through the UE by the user selecting the "Play" command 424 which causes the UE to play the user selected harmony parts. Consequently, the first harmony part which has been selected can be heard by the user during the rehearsal session. A volume or amplitude of the playback can be controlled such as by a slider or other type of control element 420.

The user can further indicate a particular harmony part (second harmony part) of the song which the user wishes to actually practice. Accordingly, the process can continue at 252 with the UE receiving a user input specifying a particular harmony part which is to be practiced. To facilitate the rehearsal or practice session, the UE can receive from the user through the GUI one or more selections to control a playback volume 254 of certain harmony parts of the song (e.g. to control the playback volume of a first harmony part while the user rehearses practices singing the second harmony part). In such a scenario, it is advantageous for the first harmony part to be played back to the user by means of headphones while the user performs the second harmony part. Such an arrangement allows the UE to separately capture the second harmony part performed by the user without audio interference caused by playback of the first harmony part. In some scenarios, the user can select a plurality of different harmony parts which are to be played back while the user rehearses or sings a selected harmony part. A volume or amplitude of the playback can be controlled by a slider or other type of control element 420.

The UE can be caused to play a certain harmony part as described herein by selecting the "Play" command 424. The UE will respond to such input by playing the user selected harmony parts (e.g. while the user sings a different selected harmony part for practice/rehearsal purposes). Alternatively, the UE can be caused to concurrently play the user selected harmony parts and record a different harmony part, which is concurrently sung by the user. This functionality can be initiated when the UE receives a user input selecting the "Record" control 426. In either scenario, the UE will display visual cues (e.g. highlighted target musical note blocks 428) to indicate the harmony part which is to be sung by the user. Such display can be arranged in a manner similar to that described herein with respect to the practice screen shown in FIG. 4D. More particularly, at 258 the UE visually displays highlighted target musical note blocks 428 for the user part while the user sings his/her part. The UE can concurrently also visually display harmony notes 422 for the harmony parts other than user part as those other parts are being audibly played back by the UE.

As the rehearsal process progresses, the UE can advantageously display at 260 real-time visual feedback to the user on a display screen of the UE. Such visual feedback can be similar to the feedback described herein with respect to FIG. 4D to indicate how well the user's singing performance matches a desired harmony part. Visual cues can be provided to indicate how well the user performance matches a desired performance with respect to one or more of pitch, volume and/or timing with respect to user's selected part.

At 262 a decision can be made as to whether the selected song or segment is done playing. If not (262: No) then the process continues at 258. At any point during the session while the song is playing, the UE can receive through its user interface at 264 a user input to rewind or fast forward through portions of the selected song. Further, at 266 the UE can receive through its user interface a user input to optionally select to save the harmony part that has just been recorded during the rehearsal session. At 268, the user can select to have the rehearsal process terminate at 270 (270: Yes), whereby the UE can terminate or return to the home screen. If the process is not terminated (268: No), then the process can continue or return to 246 so the process continues.

Figure 5A:
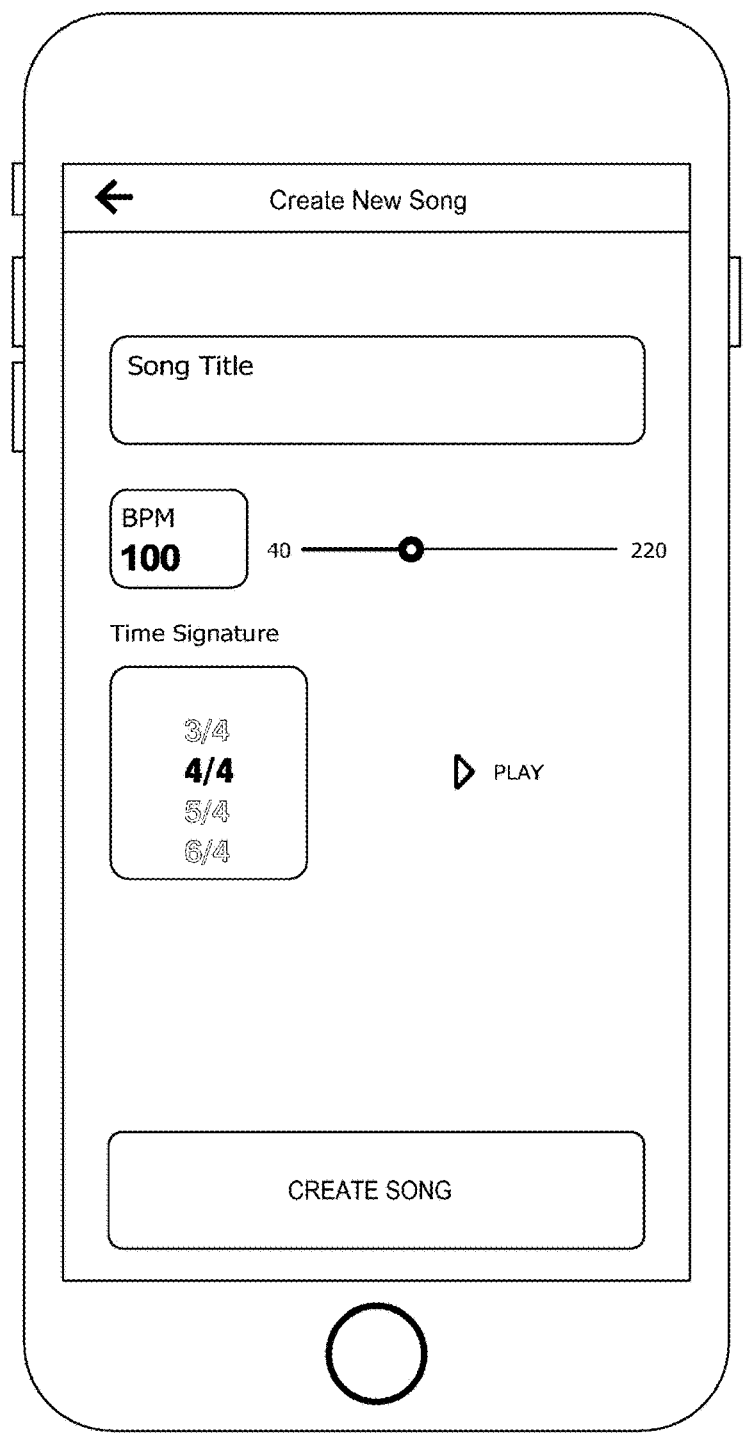
FIGS. 5A-5E are a series of drawings that are useful for understanding how a user can interact with the user equipment to facilitate creation of a new song.
Figure 5B:

An MHT disclosed herein can also facilitate creation of entirely new songs by the user. The user can record a harmony to begin the process and define that harmony as being part of a new song. Further, the user can create one or more harmony parts of the newly created song. This process is best understood with reference to FIG. 2D. More particularly, the UE can receive at 216 a user selection to "Create New Song" at 216. This user selection can be indicated by a user activation of a "Create New Song" GUI control 356 in home screen 350. At 218, the process displays the "Create New Song" GUI shown in FIG. 5A. Here, the user can insert a song title, set the beats per minute (BPM) that the new song is intended to have, and select a time signature for the song (e.g., 3/4 time or 4/4 time). As shown in FIG. 5B, the user can then proceed to set a title (e.g., "Soprano") for a particular part that they will be creating.

Figure 2D:
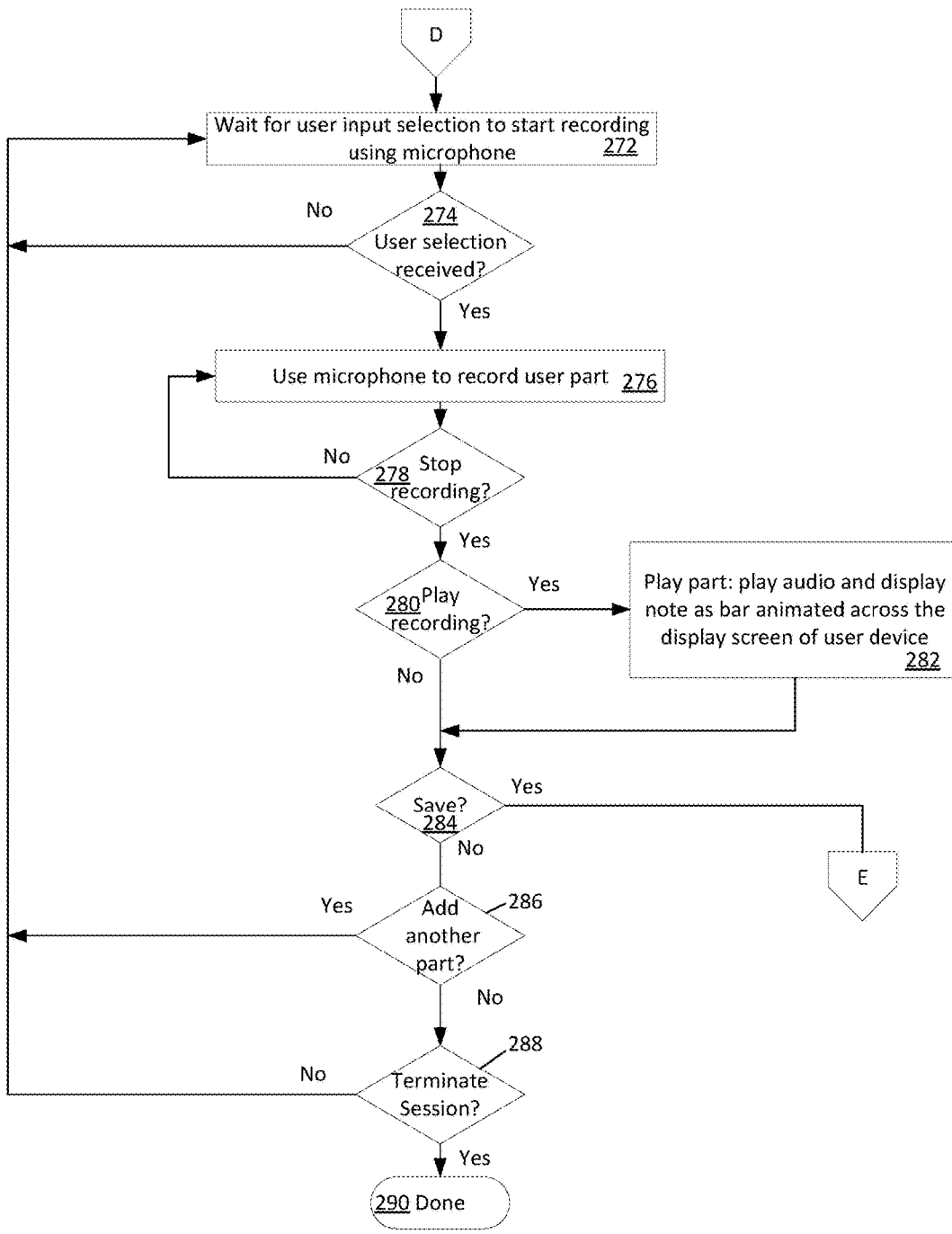
Figure 2E:
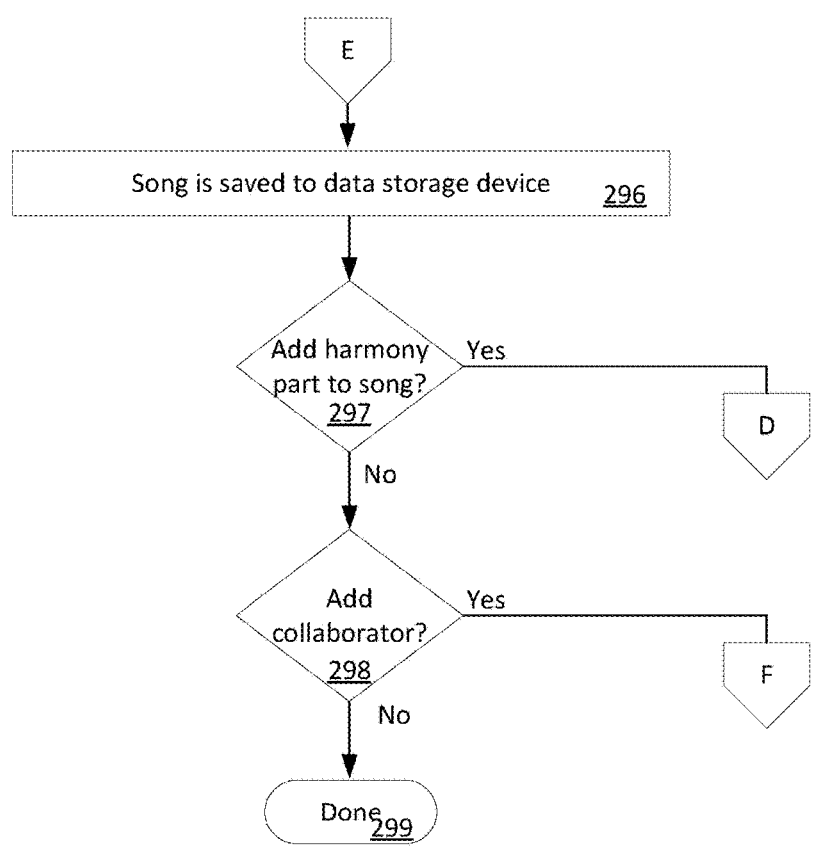
Figure 2F:
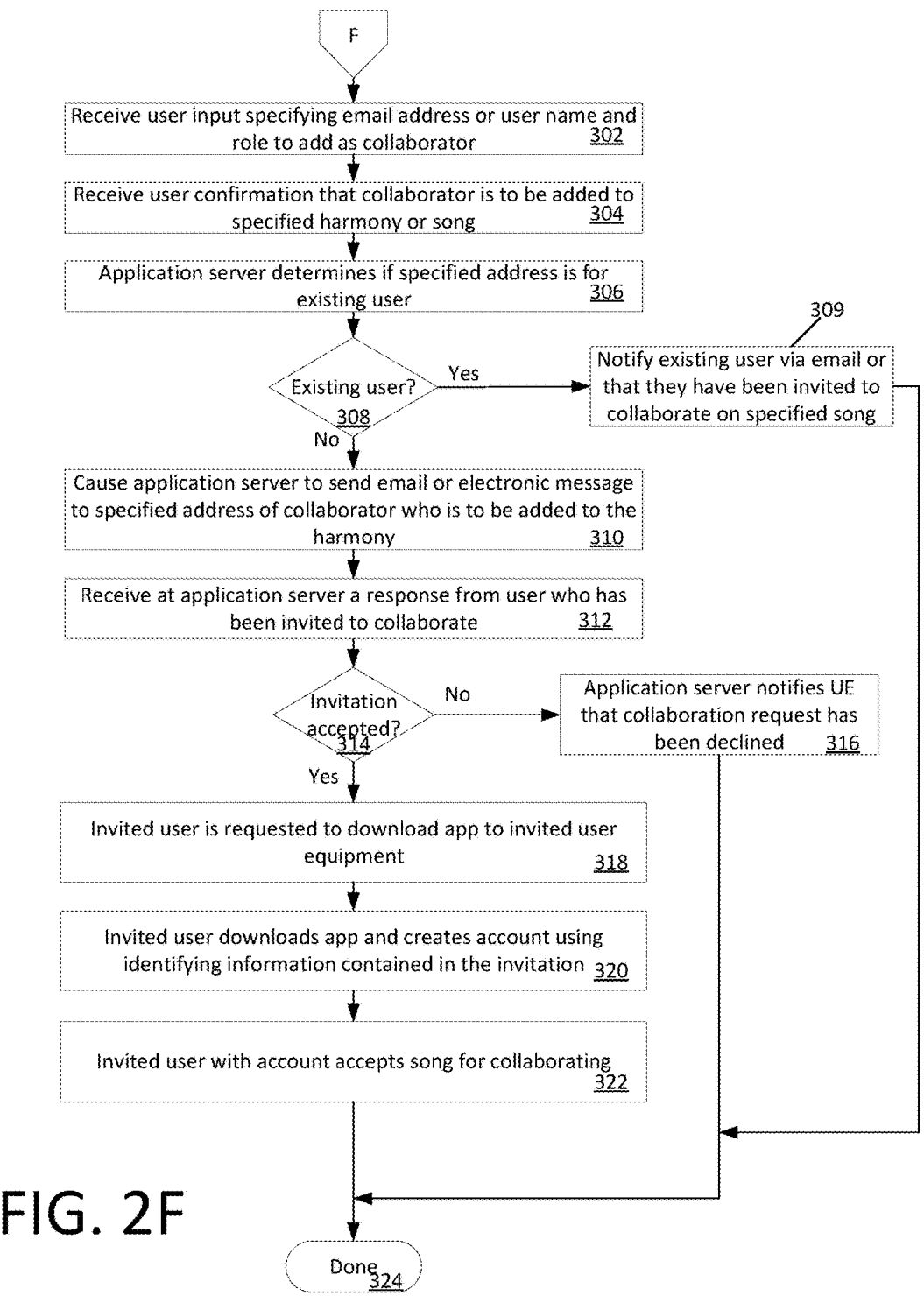

The process then proceeds to step 272 in FIG. 2D. The system can wait at 272 for a user input selection indicating that the user is ready to begin recording a new harmony. The system determines at 274 whether a user has indicated that they are ready to begin recording a new harmony. If so (274: Yes) then the process continues on to step 276 where the UE uses a microphone and associated audio circuitry to record a harmony part. If creating a new song, then the harmony part can be any harmony part the user wishes to create.

Figure 5C:
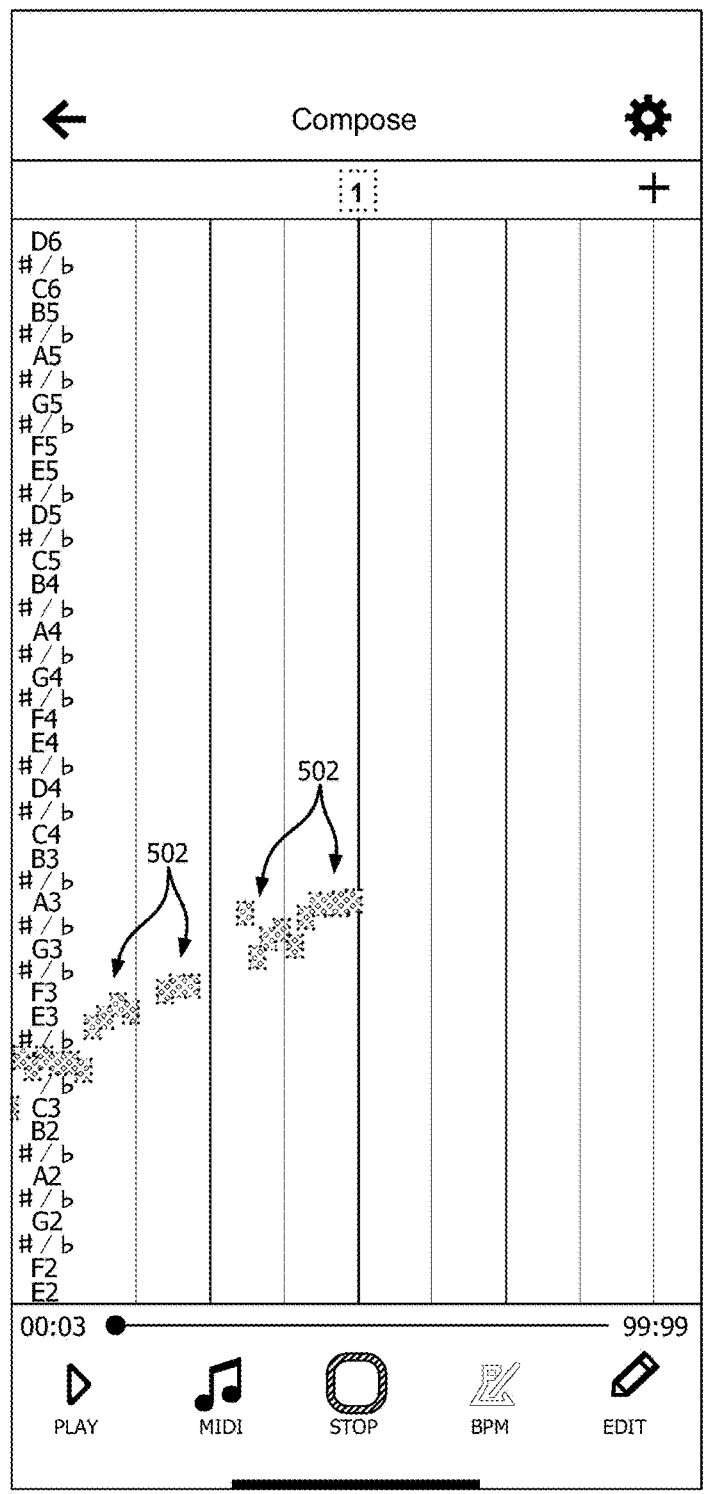
Figure 5D:
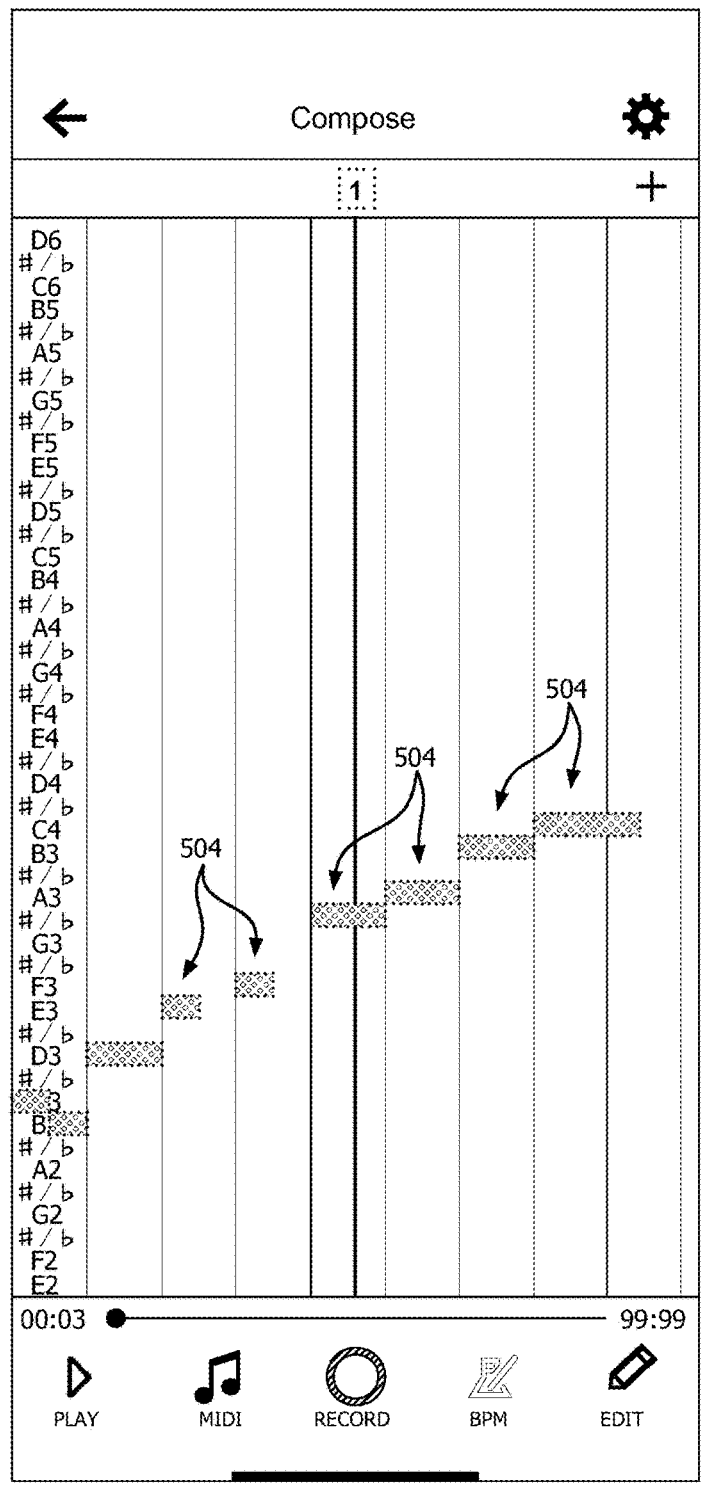

As the UE records the harmony part, it can display a preliminary indication of the pitch of the user's voice as shown in FIG. 5C. The user's voice pitch can be presented in real time as the user is singing in the form of micro-notes 502. As shown in FIG. 5C, the micro-notes are of relatively short duration. For example, in some scenarios each micro-note 502 can be 1 beat or less in duration. The UE will continue recording and wait for a user input to stop recording at 278. When such an input is received (278: Yes) it will serve as an indication that the user is done creating the harmony part. At this point, the micro-notes are combined by the UE as shown in FIG. 5D to form musical note blocks 504. For example, this step can be performed in some scenarios through the use of post processing operations performed by the UE after the recording operation has been stopped.

The UE can then offer the user the opportunity to play the part at 280, in which case the newly recorded harmony part will be played at 282. The user may be provided with the opportunity at 284 to decide whether the newly recorded harmony part should be saved. If so (284: Yes) then the process continues on to step 296 in FIG. 2E.

At 286 the user can be prompted as to whether they would like to add another harmony part. If so, the process can return to 272. Otherwise the user can elect to terminate the Build Harmony section at 288. If so (288: Yes) then the session terminates at 290 or returns to the MHT home screen.

Figure 5E:
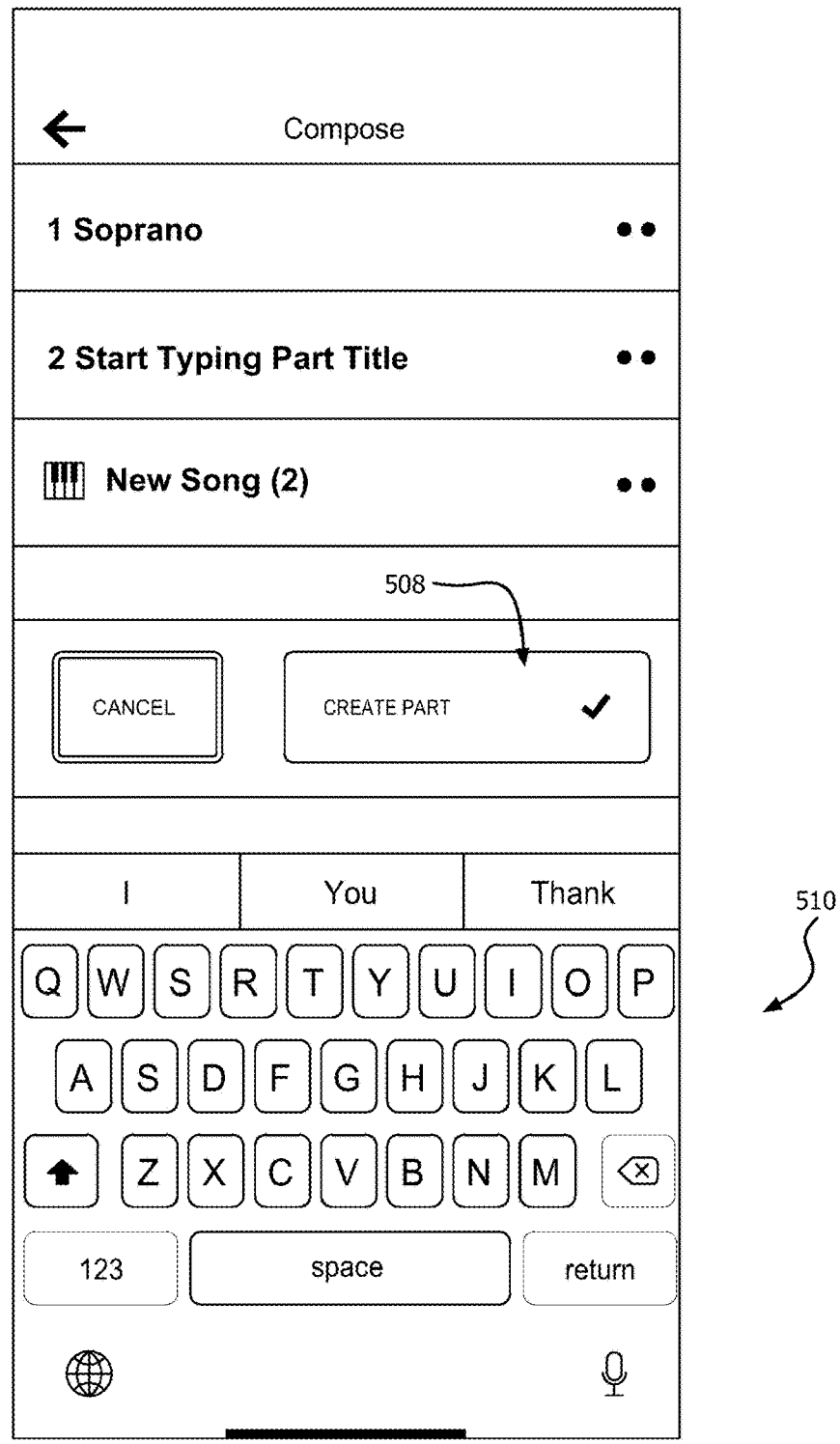

FIG. 5E illustrates an example of a UE screen display in a scenario where the user has elected at 286 to add a further harmony part to the song. In FIG. 5E the part named "Soprano" has been created as "track 1" and a second part (e.g. "Alto") can be added by the user as "track 2" by using the keypad 510. If the user chooses to proceed with the creation of the second part (297: Yes) in FIG. 5E, they can activate a user interface control 508 to cause the UE to create the second harmony part. The process can then return to step 272 in FIG. 2D.

In some scenarios, the process can continue at 298 where the user can be prompted to indicate whether they wish to add a musical collaborator to participate in the creation of one or more harmony parts. If no collaborator is to be added (298: Yes) the process can terminate at 299 or can return to a home screen. If a collaborator is to be invited to participate, then the process can continue with step 302 shown in FIG. 2F.

At 302 the UE can receive user input from the user specifying an email address, user name, and/or role (e.g. a harmony part) of a potential collaborator. Thereafter, at 304 the UE can request and receive confirmation that the identified person is to be invited to participate as a collaborator with respect to a specified harmony or song. At 308, the UE can communicate with the application server 102 to determine whether the identified person is an existing user of the MHT system described herein for which user account data is available. If so, then the application server 102 can cause the person to be notified (e.g. via email or text message) at 309. For example, the application server 102 can send a message to the identified person that they have been invited to participate as a collaborator in connection with creation of a particular song.

In some scenarios, the person invited to collaborate is not an existing user (308: No), in which case the UE can cause the person to be notified (e.g. via email or text message) that they have been invited to participate in creating a song using the MHT tool. For example, such invitation can be generated by an application server 102. A response may be subsequently received from an invitee at 312 (e.g. received at the application server). If the response indicates rejection of the invitation (314: No) then the application server can send a notification to the UE which initiated the invitation that the collaboration request has been declined. However, if the invitation is accepted (314: Yes) then the process continues to 318 where the invited user is requested at 318 to download an MHT software component (an application) to the invitee's UE. Thereafter, the invitee can download the software component to their UE and can create an MHT account at 320 by communicating account data to the application server 102. Having downloaded the required software component and established themselves as a new user of the MHT system, the invited user or collaborator can then accept a particular song on which they have been invited to collaborate. The process terminates at 324 and/or can return to a system home screen.

Figure 6A:
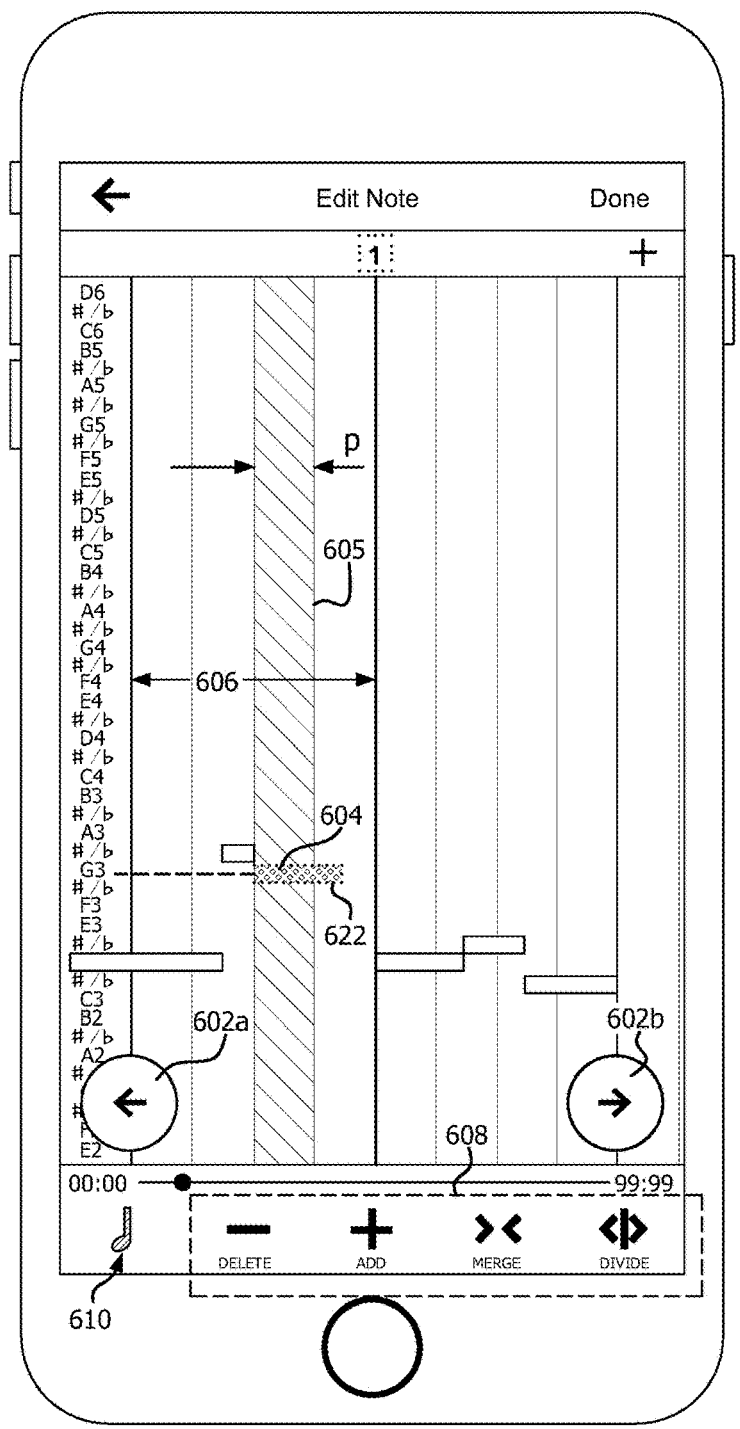
FIGS. 6A-6B are a series of drawings that are useful for understanding how a user can interact with the user equipment to facilitate editing of an existing harmony track.
Figure 6B:
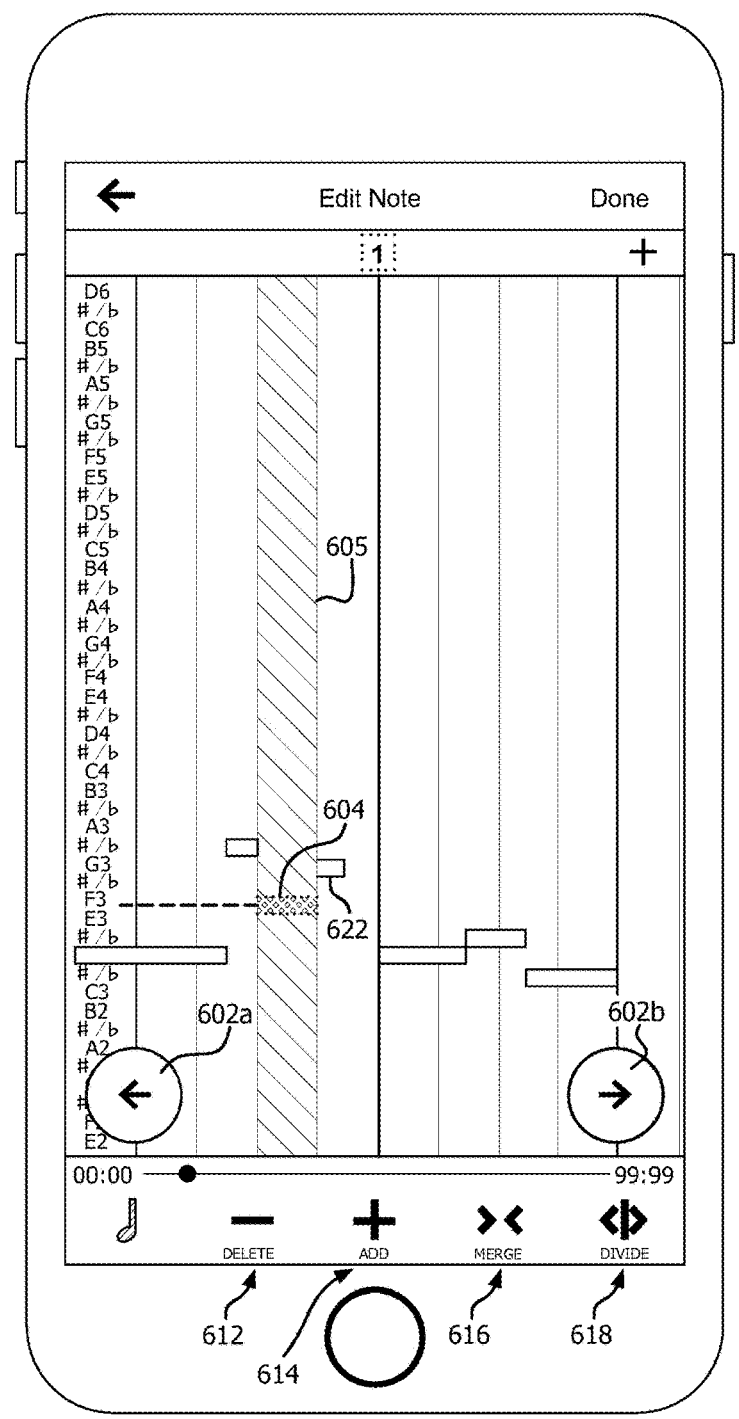

During a process of creating a new song or modifying an existing song it can sometimes be desirable to edit an existing harmony track. This process is illustrated in FIGS. 6A and 6B. The process can involve displaying a note grid for a particular track that has been recorded. The note grid can be similar to the note grids described herein with respect to FIGS. 4C-4D and/or FIG. 5D. The user can manipulate a highlighted vertical note region bar 605. According to one aspect, the UE can be configured using a note size selector control 610 to vary a width p of the bar, and thereby choose from 16th, 8th, quarter, half, or whole notes.

In the scenario shown in FIG. 6A, the user has used next and back scroll controls 602a, 602b to selectively control which portion of a note grid is displayed. The user has set the note region bar to correspond to a quarter note. In the displayed note grid, the user can control operate user interface so that the note region bar 605 aligns with a particular note to be edited.

Once a particular note has been selected, the user can make use of a plurality of available editing controls 608 to perform a user initiated operation on the selected note. For example, the available editing control 608 can include a delete control 612 to permit the user to delete the selected note, an add control 614 to allow the user to add a new note, a merge control 616 to allow the merging of two existing notes in the note grid, and a divide control 618 which allows the user to divide a note into two notes of shorter duration.

In the example shown in FIGS. 6A and 6B, the note which the user has marked for editing is the third quarter note 604 in a measure 606. The user marks this note 604 with note region bar 605 to indicate that note 604 has been selected for editing. The user then activates the divide control 618 to split the quarter note 604 from note 622. The user further makes use of the user interface to lower the pitch of the note from G3 to F3. For example, in a UE equipped with a touch-screen, this adjustment in pitch to the highlighted or marked note 604 can be accomplished by using a finger to slide or drag the note 604 to correspond to a different note on the scale. The edited harmony track can be saved by the UE when the user has completed all necessary edits.

Real-Time Pitch Detection

Real-time pitch detection (RTPD) processing in the solution presented herein is implemented by a novel technique involving evaluation of a monophonic audio signal as produced by an individual human singer. Specifically, it is designed to give accurate feedback to a singer about their actual pitch and amplitude relative to the known "correct pitch and amplitude". The RTPD processing involves a frequency-domain based algorithm using a modified Fast Fourier Transform (FFT). The FFT is optimized for audio frequencies which are singable by the human voice (approx. 60 Hz-1400 Hz). The process is described below in further detail with reference to FIGS. 7 and 8.

The process begins at 702 and continues at 704 where a constant-Q transform is applied to detect pitch information of from an audio signal sample or chunk. As is known, a standard FFT transform can be used to faithfully convert chunks of time-domain data (audio signal) into frequency-domain data (spectrogram). In a conventional FFT, this frequency-domain spectrogram is linear. However, the human ear distinguishes pitch on a pseudo-logarithmic scale. Therefore, instead of a traditional FFT, the RTPD processing algorithm in the present solution uses a "constant-Q" transform where "Q" is the ratio of the center frequency to the bandwidth of a corresponding logarithmic filter.

The constant-Q transform is well-known in the field of signal processing and therefore will not be described herein in detail. However, it will be understood that the constant-Q transform is computed by applying a FFT after first applying a logarithmic filter to the underlying data. As is known, this process can be equivalently implemented as applying the FFT with a logarithmic kernel. See, e.g., Brown, J. C., & Puckette, M. S. (1992). An efficient algorithm for the calculation of a constant Q transform. *The Journal of the Acoustical Society of America*, 92(5), 2698. http://doi.org/10.1121/1.404385).

In practice, a large number of parameters must be chosen for this constant Q transform, and these parameters can be optimized for the special case of giving real-time feedback to human singers. For example, an RTPD processing algorithm can advantageously involve the application of the following specific parameters, which were identified empirically as a result of experiments with audio recordings of professional singers:

FFT bins per octave is set to 48, in order to create sufficient frequency resolution for feedback purposes while maintaining real-time performance on modern mobile devices.

Frequency to bandwidth ratio of the logarithmic filter is set to a value between 250 and 300 Hz, which provides a good tradeoff between filtering spurious microphone/background noise and precision. For example, in some scenarios, the value can be chosen to be 275 Hz.

Length of the audio signal used is set to 2048 samples (42.7 ms sample length for 48 kHz sampled audio, or 50 ms sample length for 41.1 kHz sampled audio), which provides sufficient frequency resolution for this application without introducing a significant processing delay before feedback can be provided to the singer.

As is known, the window size of an FFT that is selected for pitch detection will affect the frequency resolution. A bin is a spectrum sample of the audio signal, and can be understood as defining the frequency resolution of the FFT window. Frequency resolution for pitch detection is improved by increasing the FFT size, i.e., by increasing the number of bins per octave. However, an excessive number of bins can result in processing delays that render real-time pitch detection impractical. The parameters identified herein have been determined to provide acceptable resolution of singing pitch while still facilitating real-time processing for the benefit of the singer.

Figure 8A:
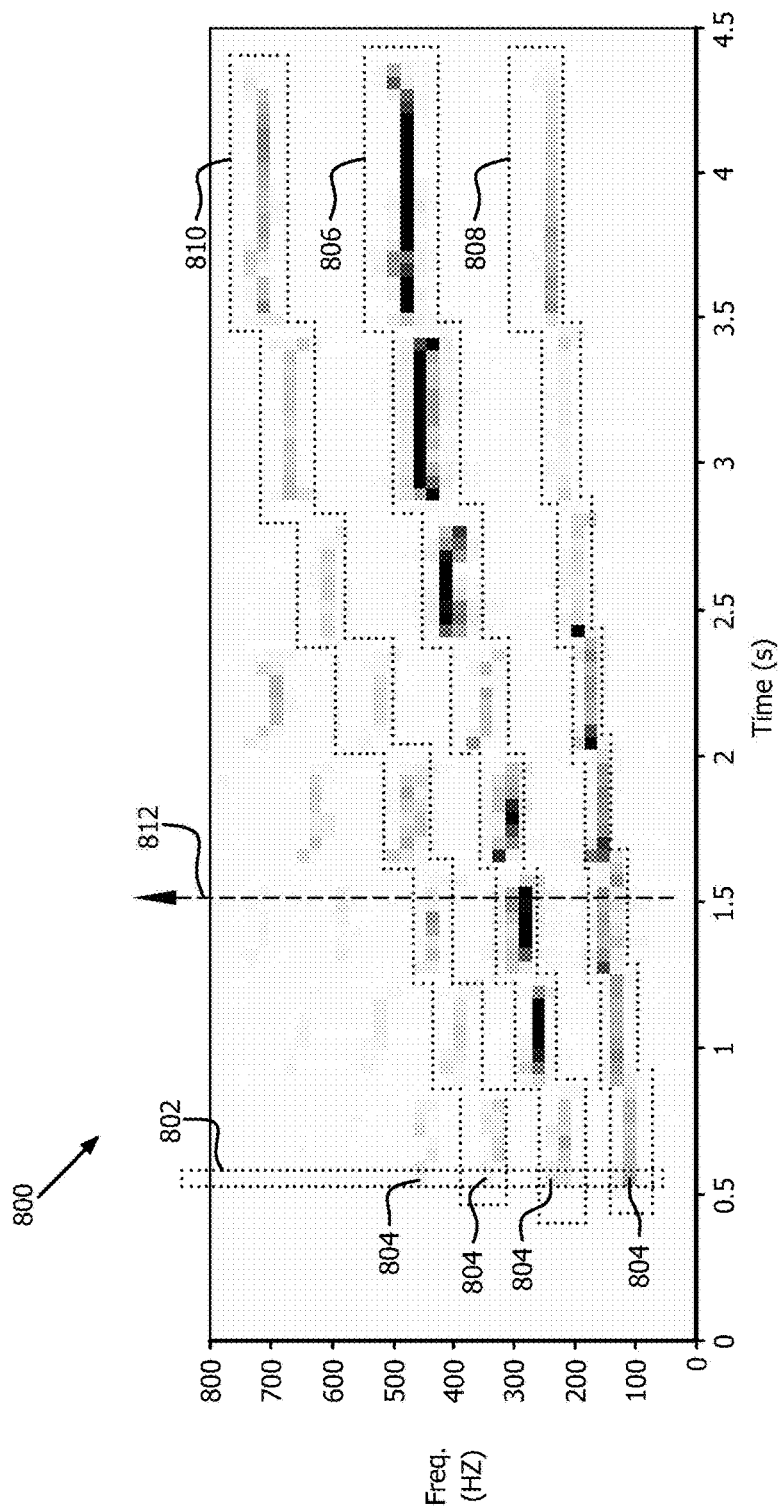
FIG. 8A is a histogram that is useful for understanding certain aspects of the real-time pitch detection process.

With the foregoing parameters applied, an RTPD processing algorithm detects the current pitch based on the constant Q transform of a short audio signal with N samples $Q_A=Q(a_0 \ldots N)$ by detecting the peak frequencies and generating at 706 a histogram of potential "pitch candidates". An example histogram 800 showing the results of this process are illustrated in FIG. 8A. The plot in FIG. 8A shows estimated pitch frequency versus time. The particular plot shown in FIG. 8A was obtained by applying the constant-Q transform described herein to audio of a tenor singing eight notes of a major scale. These eight notes start at a low frequency of approximately 220 Hz and end at a high frequency of approximately 440 Hz.

In histogram of FIG. 8A, each bin 804 is represented as a shaded rectangle. Each column 802 of bins 804 is created from one sample of the audio signal. For example, in a scenario where the duration of the audio signal sample is set to 2048 as described above, the audio signal sample associated with each bin would have a duration of 42.7 ms (in the case of 48 kHz sampled audio). Further, it can be observed in FIG. 8A, that each rectangular bin 804 is shaded to an extent. In the example shown, the darker shaded rectangles represent higher estimated power levels in that bin. The bins which correspond to the eight major notes which are sung in this example are identified by reference number 806.

Figure 8B:
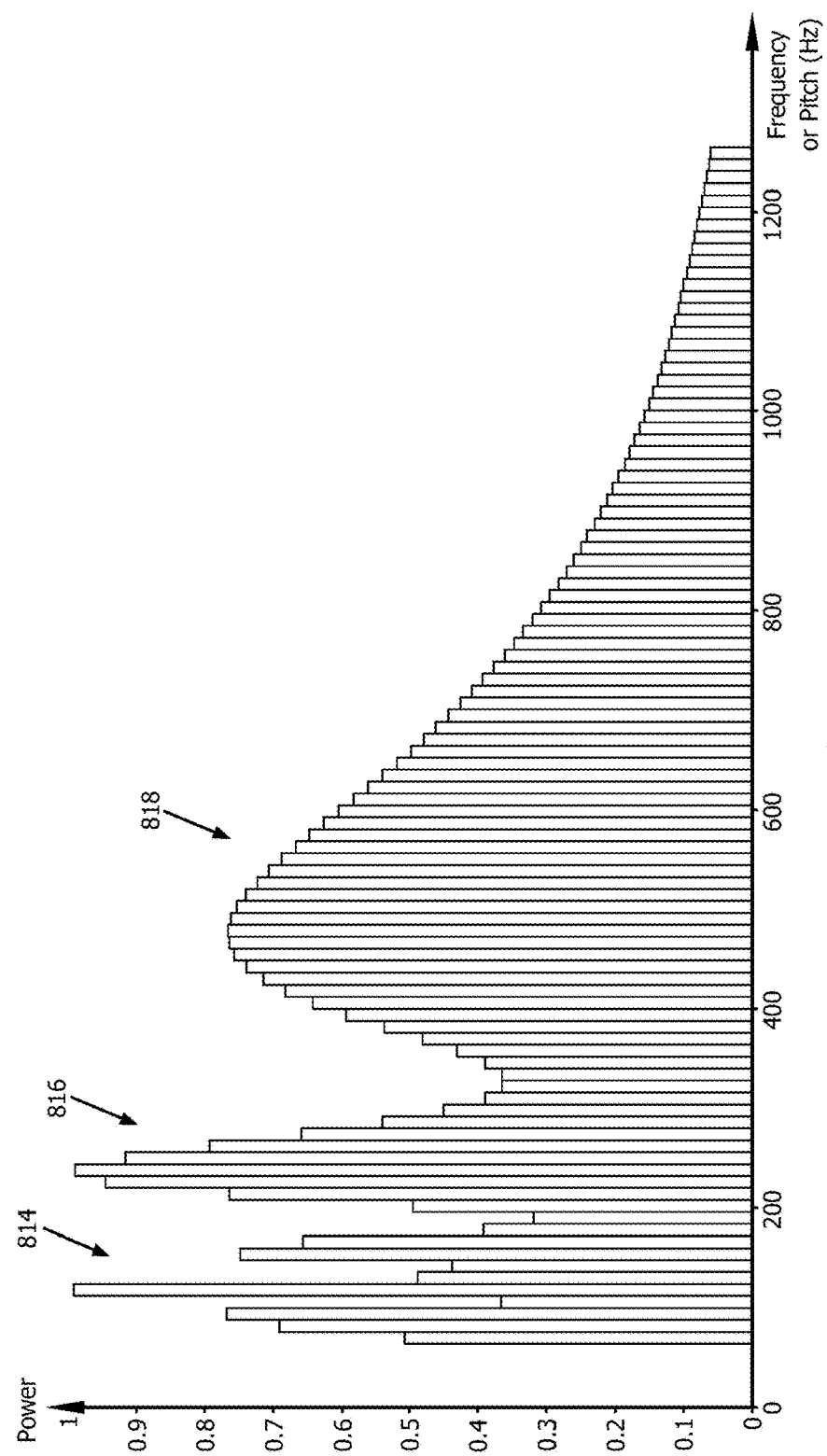
FIG. 8B is a plot which is useful for understanding power variations among bins associated with a particular audio sample.

The process continues by qualifying the pitch candidates obtained in 706. To qualify pitch candidates, the RTPD processing algorithm can search those bins which correspond to each particular audio sample. For example, this search can proceed from lowest to highest frequency within a predetermined frequency search range to identify locally maximal bins (i.e., bins having a locally maximal power level) which are associated with a particular audio sample. Shown in FIG. 8B is a plot which is useful for understanding this process. FIG. 8B shows how the power level which is associated with bins covering various frequency ranges will vary with respect to frequency for given audio sample or chunk. This plot can be understood conceptually with reference to FIG. 8A which shows that bin power variations along an axis line 812 can be evaluated among a set of bins in a particular column that are associated with one particular audio sample or chunk. It can be observed in FIG. 8B that a resulting plot of bin power versus frequency will include one or more local maxima or local peaks 814, 816, 818 where the power level of particular frequency ranges is noticeably of greater magnitude as compared to other nearby frequencies. Each local maxima or peak will have a contour or shape which can be mathematically characterized.

Starting from the lowest frequency is useful to ensure that the correct peak is identified. Partial onsets with lower frequency (e.g., local peak 814) do not typically have higher energy than the correct pitch (e.g., local peak 816 in this example). In contrast, for the case of human singing, partial onsets at higher frequencies (e.g., local peak 818) will sometimes have slightly more energy in them as compared to the correct pitch. Accordingly, by scanning the peaks from the lowest to highest frequency and only accepting pitch candidates which exceed a certain threshold proportional to the current best (i.e., greatest magnitude) peak (for example at least 110% larger than the current best peak), partial onsets with a higher energy can be avoided in most cases. Further, the RTPD processing algorithm is advantageously optimized for human voice by searching a range 62 Hz-1284 Hz, and frequencies outside this range are not considered as potential matches. This optimization speeds up computation significantly.

Figure 7:
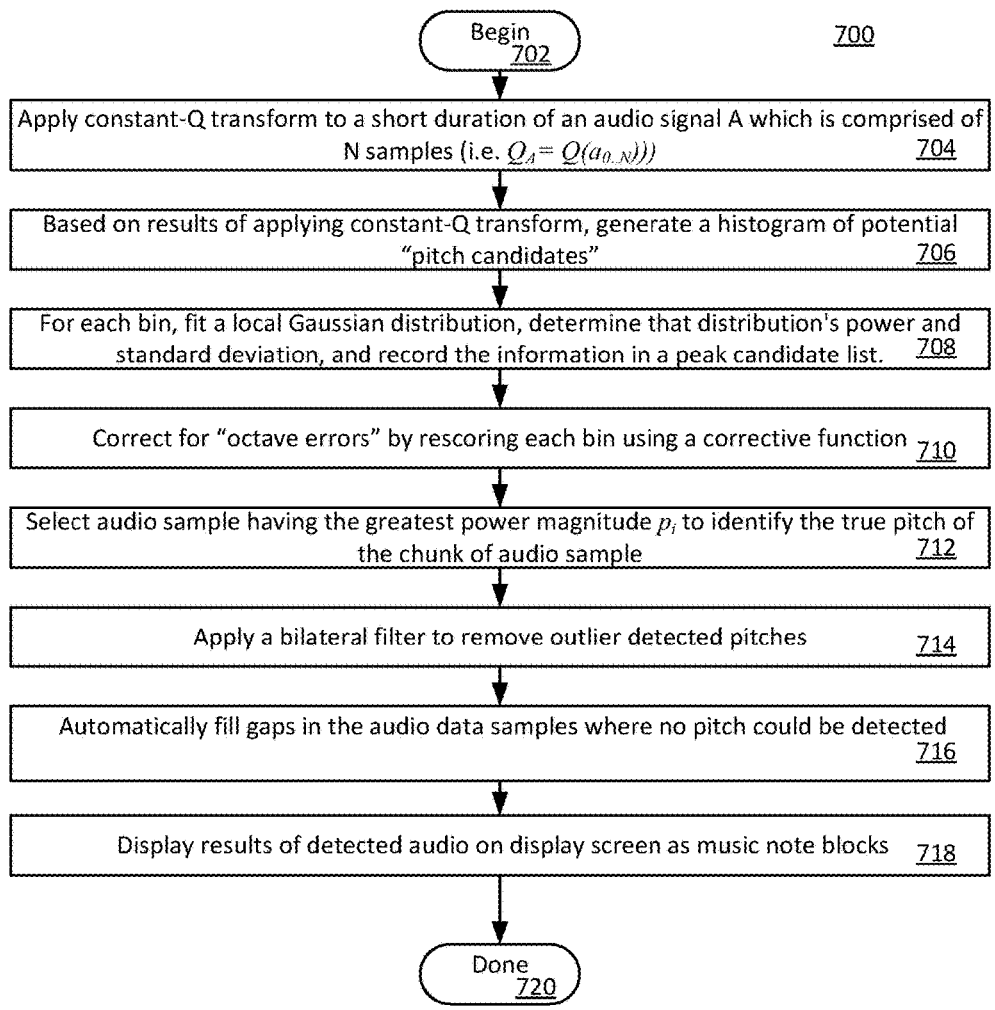
FIG. 7 is a flowchart that is useful for understanding a real-time process for pitch detection.

In the flowchart shown in FIG. 7, the above-described qualifying process is referenced at 708 where, locally maximal bins in each column 802 are identified, after which a Gaussian distribution is fit to the data in the nearest five bins 804 relative to the locally maximal bin (two lower bins, the center bin which is the local maxima, and two higher bins). This fitting process allows the contours of the local maxima (e.g., local maxima 814, 816, 818) to be characterized. According to one aspect, the Gaussian distribution can be fit to the data by using the maximum likelihood method. This fitting process is applied in this way as a basis to estimate and/or characterize the shape and amplitude of the peak. The power level $p_i$, standard deviation $\sigma^i$, and mean frequency of that Gaussian distribution is recorded in a peak candidate list.

At 710 the process continues by correcting octave errors. As used herein, the term "octave error" refers to errors in pitch identification which are off by approximately one octave (known as a partial onset). When attempting to identify a pitch, conventional algorithms will often simply choose the pitch candidate having the greatest magnitude power level. But as may be appreciated from the plot in FIG. 8, a pitch candidate represented by a bin with the greatest magnitude of signal power does not always correspond to the true pitch in associated with an audio signal sample. Early-onset (lower than true pitch) and harmonic (higher than true pitch) partial onsets often accompany the voice of a singer due to the complexity of the human vocal system. These types of octave errors manifest themselves as the groups of bins (e.g. bin groups 808, 810) which appear below and above bins 806 in FIG. 8A. Conventional algorithms that do not account for these effects are prone to making octave errors. In this regard it may be noted that the term "octave error" is in some respects a misnomer, since early-onset and harmonic pitches are not in general off by precisely an octave. However, it remains a useful shorthand way of referring to pitch detection errors which are generally off by approximately one octave.

Octave errors in the solution presented herein are advantageously corrected using the following corrective function to re-score each bin associated with an FFT of a particular audio sample:

$$p_i^* = p_i + \sum_{\omega \in \Omega} \int_{x \in G_i} Q_A(\omega - x) \cdot G_i(x) dx$$

where
$p_i$, is the power of the i-th peak candidate,
$\Omega_{i \in \mathcal{N}} = 69.203 \ln(i)$ is a discrete set of partial onsets unique to human vocal system,
ω is a partial onset frequency in Ω
$G_i$ is the Gaussian distribution fit to the i-th peak candidate,
x is a frequency offset in the domain of Ω, and
$Q_A$ is the constant-Q transform of the audio signal.
Conceptually, this equation adds additional energy to each peak candidate when energy distribution or shape of the peak within the partial onsets of that pitch look similar to the energy distribution of the peak candidate under consideration. An example of such a scenario is illustrated within column 802 of FIG. 8, wherein a partial onset peak present in bin group 808 and/or 810 might look similar to a peak candidate bin in bin group 806. Note that this corrective function presented herein only makes sense in the "constant Q" domain and not after a traditional FFT. This correction factor is effective at removing spurious pitch candidates without partial onset support (i.e. unlikely to be due to human singing) and reinforces the true pitch. At 712 the RTPD will determine the true pitch of each audio sample by selecting the pitch with largest $p_i^*$ value from among the bins associated with that particular audio sample.

At 714 and 716 the RTPD processing algorithm removes common pitch tracking errors that occur during the beginning of sung notes and around harsh consonants where no true pitch exists. It achieves this result by using a bilateral filter to remove outlier detected pitches and by automatically filling holes or gaps where no pitch could be detected. As is known, a bilateral filter uses two kernels simultaneously. For purposes of the present solution, the spatial kernel is a Gaussian operating on the pitch frequency, and the range kernel is a Gaussian operating on the audio signal amplitude. This can also be thought of as a weighted average at each audio sample, where the weights are determined based on similarity in both pitch and amplitude. After outlier pitch values are removed, the result can be displayed at 718. Thereafter, the process can terminate at 720 or continue with other processing.

Note Transcription Algorithm

Figure 9A:
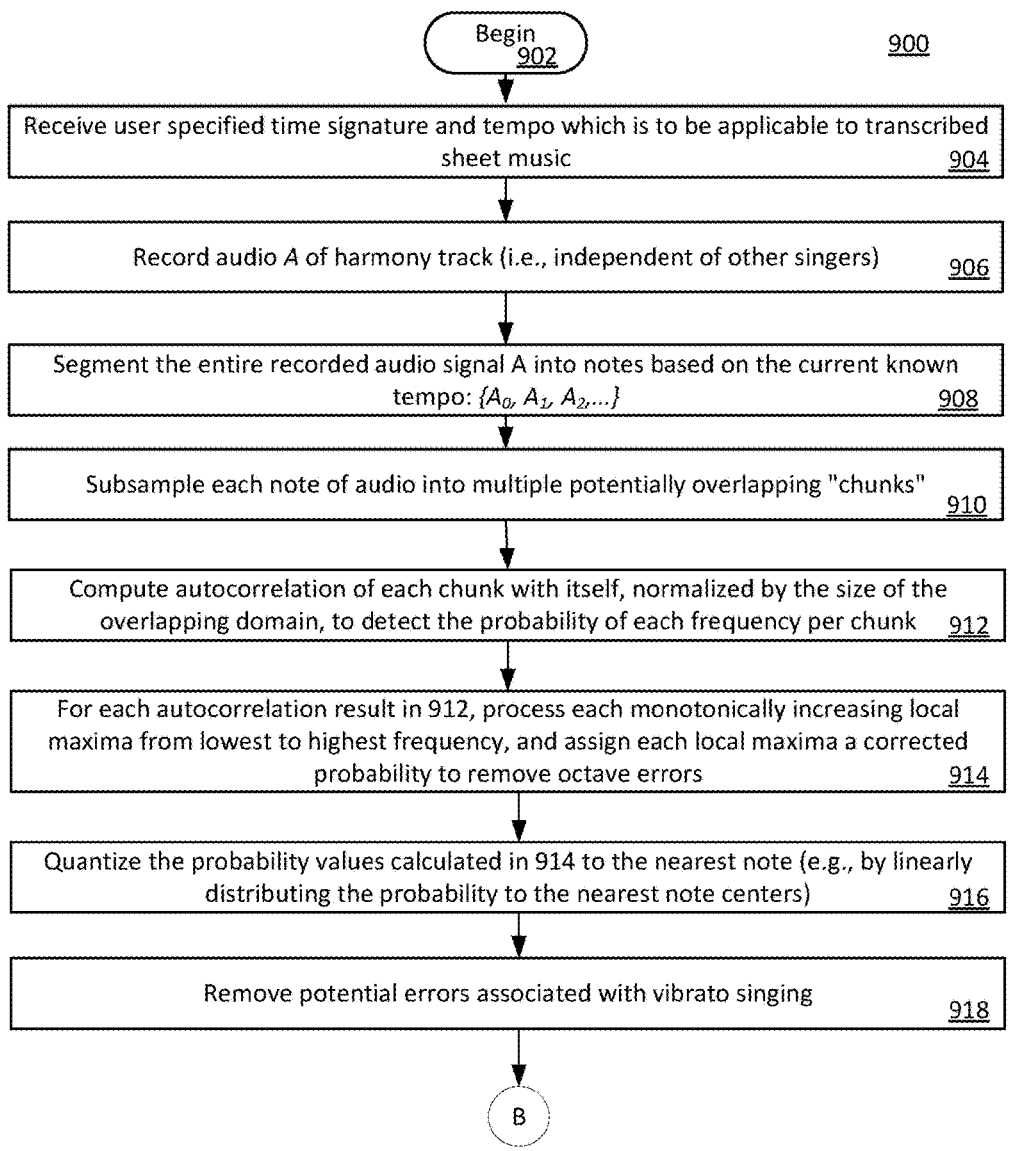
FIGS. 9A-9B are a series of drawings which are useful for understanding a flow of a note transcription process.
Figure 9B:
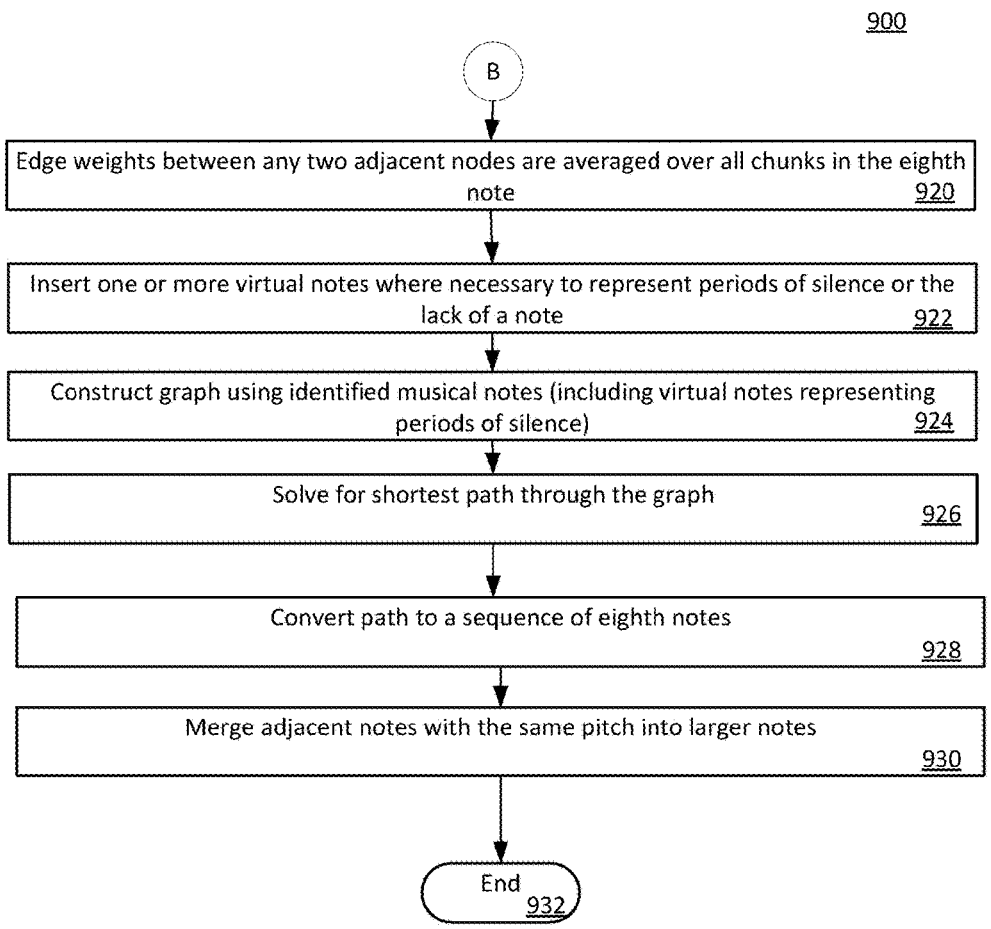

The solution disclosed herein also concerns a process involving note transcription. This note transcription process is illustrated in FIGS. 9A and 9B. The process utilizes a note transcription (NT) algorithm. The NT algorithm is an audio analysis procedure for converting an audio recording of an individual singer (monophonic audio) to a sequence of non-overlapping notes with pitch and duration information (suitable for creating sheet music or a MIDI file, for example). While RTPD is optimized for real-time feedback and provides information on the pitch hundreds of times per second, NT is optimized for detecting individual notes aligned to the time signature and tempo of a song. In practice, NT must often make difficult decisions when singers are slightly between two keys (C vs C# for example), which necessitates deeper contextual awareness than RTPD. Utilization of two entirely different algorithms in this way is noteworthy in this context. By selectively applying a different audio analysis process or method to what might otherwise be understood to be basically the same problem, a non-obvious result is obtained for achieving improvements in both real-time pitch detection and in note transcription. These performance enhancements would not be possible one algorithm or the other was used exclusively for both types of audio analysis.

To facilitate creation of a new harmony, it is advantageous to have (1) the audio of the singer for each harmony track (independently) and (2) some user-specified timing information applicable of the "sheet music" (which can include one or more of the time signature, tempo, and notes) over the duration of the song. Accordingly, the process 900 can begin at 902 and continue at 904 where the system receives a user input manually specifying a time signature and tempo which is applicable to a transcribed sheet music.

Conventional note transcription solutions do not accept the song tempo as input, since this information is not available in a typical unstructured setting. In contrast, the NT algorithm is intended to be embedded into an application where this information can be provided by the user before a particular song is sung. Since the time signature and tempo are set in advance, the search space for possible note configurations is greatly reduced. Consequently, the NT algorithm is able to improve the accuracy and fidelity of transcription results over conventional note transcription solutions.

After the user has manually entered the time signature and tempo data, the user can sing and record each part or track of the harmony at 906. Thereafter, the process can continue whereby the one or more audio tracks associated with the user singing is automatically analyzed by the NT algorithm. As explained below in greater detail, the result is an automatic production or transcription of the corresponding "sheet music", which can later be edited.

Figure 10:
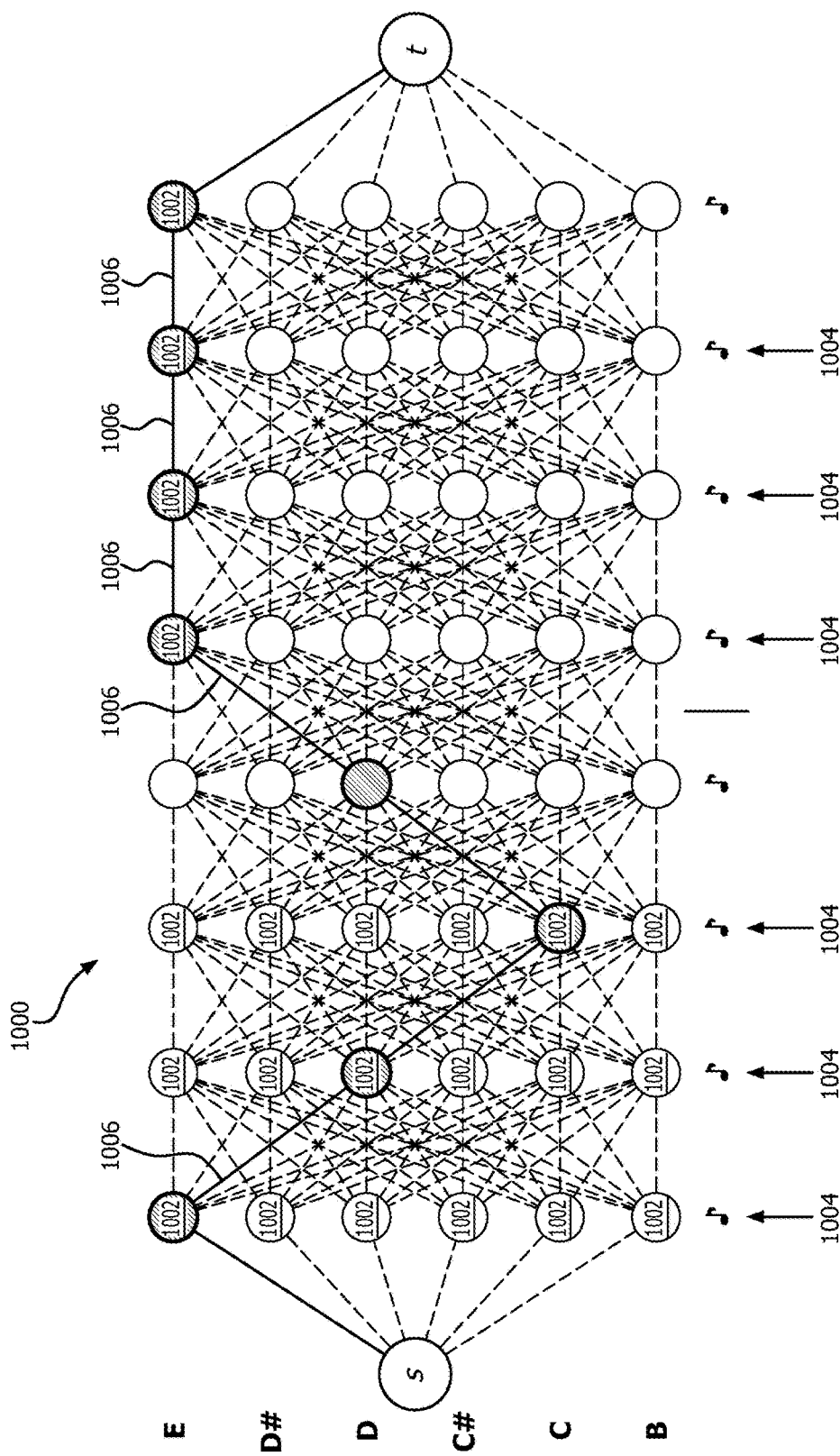
FIG. 10 is a graph which is useful for understanding certain aspects of a note transcription process described herein.

According to one aspect, the NT algorithm can solve the transcription problem by converting the problem of audio transcription into a shortest-path problem. This process is best understood with reference to FIG. 10, which is a simplified diagram showing a shortest path through the network that defines the optimal pitch assignment for each note. In graph theory, the shortest path problem involves finding a path between two vertices (or nodes) in a graph such that the sum of the weights of its constituent edges is minimized. In the present solution, each column 1004 of nodes in a graph 1000 represents one eighth note duration in the song, and individual nodes 1002 will represent a possible pitch for this eighth note.

The weight assigned to each edge 1006 between adjacent nodes i and j is the negative log likelihood of the probability that the next note has the pitch associated with node j, assuming that node i was selected. This edge weight balances the probability that node j is in the song independent of any other information, along with a regularization factor that takes into account the previous note. The regularization is important in cases, for example, where a singer is slightly off pitch or oscillating between notes; in this case, even though a note may appear to be the most likely in isolation, making a global decision based on the entire path through the notes via the regularization factor allows us to choose one continuous pitch for several notes in a row rather than oscillate incorrectly between notes because each is slightly more likely in isolation. The shortest path from source s to sink t will include one node per column 1004, identifying which pitch should be assigned to the eighth note.

There are several steps involved with the assigning weights to each edge 1006 of the graph. The process first segments at 908 the entire audio signal A into fractional notes or note segments based on the current known tempo: $\{A_0, A_1, A_2, \ldots\}$. In some scenarios described herein, the fractional notes or note segments can comprise eighth notes. The specific choice of eighth notes is arbitrary, and not considered critical to the solution. Accordingly, other note durations are also possible. Still, for the purposes of the presenting the solution herein, it is convenient to describe the process with respect to eighth notes. Each eighth note of audio is then subsampled at 910 into multiple standard length (potentially overlapping) "chunks" $\{c_0, c_1, \ldots, c_M\} \in A_i$. In a solution presented herein, these chunks can comprise 4096 subsamples (each 93 ms in duration for 44.1 kHz audio, and 85 ms in duration for 48 kHz audio) and eight chunks per note are selected. However, the solution is not limited in this regard and subsamples of different durations and alternative note segmentations are also possible.

The chunks of audio signal obtained at 910 can either be sampled regularly from the eighth note of audio, or sampled at randomized times within the eighth note. According to one scenario, the chunks are randomly sampled from among a distribution that samples more frequently near the middle of the eighth note. Such a scenario can help avoid data obtained near the leading and trailing edges of notes that might contain samples of previous/next notes when the singer is not perfectly on tempo.

After the chunks have been obtained at 910, the process continues by computing at 912 the autocorrelation $R(\tau)$ of each chunk with itself, normalized by the size of the overlapping domain, to detect the probability of each frequency per chunk. This process can be understood with reference to the following expression:

$$R(\tau) = \sum_{i=0}^{4096} \frac{(c(i+\tau) - c(i))^2}{4096 - \tau}$$

where
$\tau$ is the lag time in samples,
$c(i)$ is the $i^{th}$ sample from audio in the chunk, and
$c(i+\tau)$ is a sample from the same chunk, offset by the time lag.

$R(T)=0$ for an audio signal perfectly periodic every x samples. The frequency probability is defined as $S(f)=R(4096/f)^{-1}$.

Figure 11:
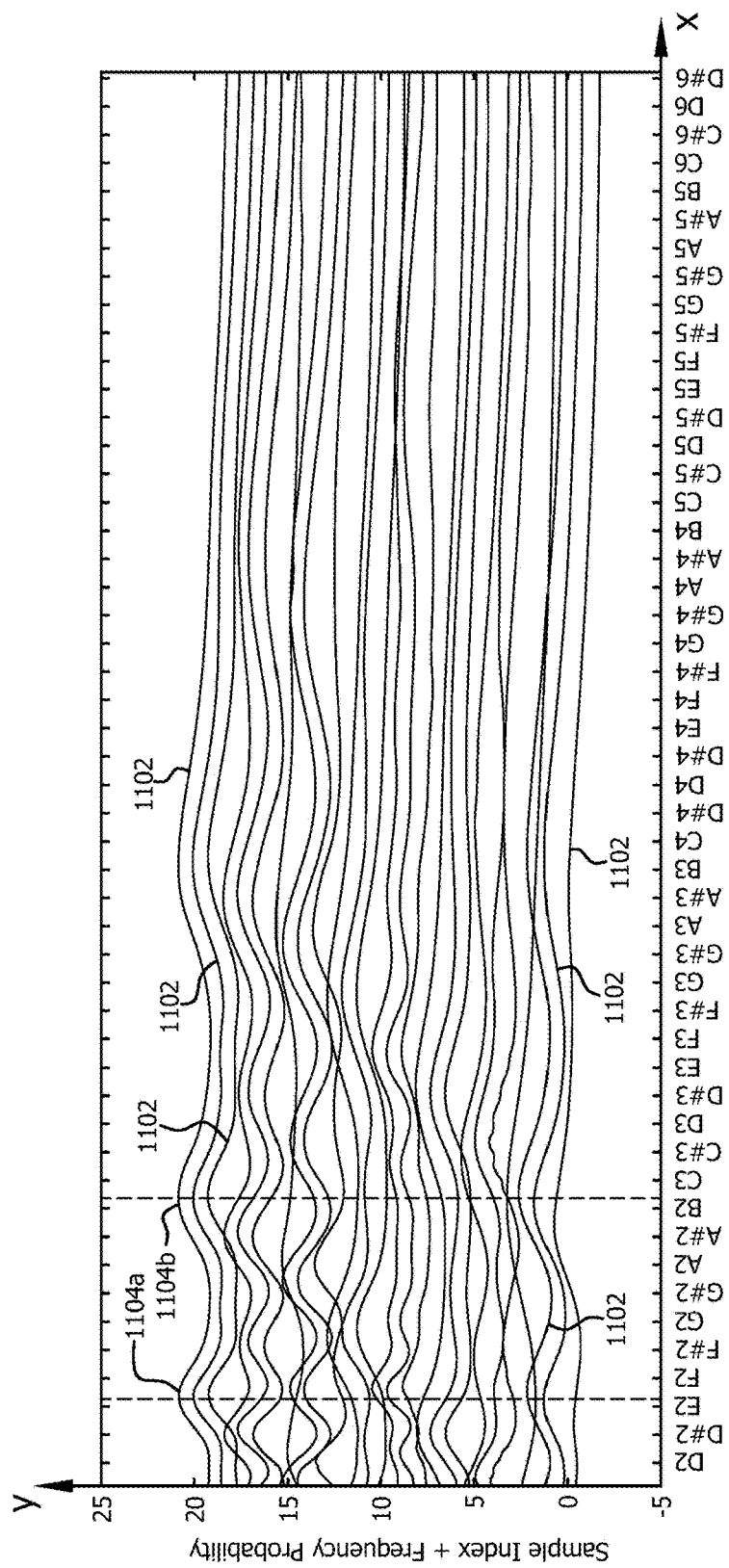
FIG. 11 is plot which is useful for understanding how frequency probabilities can be determined for short segments of an audio track.

An example result of the foregoing autocorrelation process is presented in FIG. 11. FIG. 11 is a graph showing sample index plus frequency probability value (y axis), plotted against musical note values (x axis) for a small selection of chunks. In FIG. 11, each line 1102 corresponds to one chunk and the peaks (e.g., peaks 1104a, 1104b) in each line indicate a local probability maxima corresponding to certain frequencies listed along the frequency axis. For example, it can be observed in FIG. 10 that local maxima 1104a corresponds approximately to note E2, and local maxima 1104b corresponds approximately to note B2. In this regard, FIG. 11 is useful for illustrating one difficulty with autocorrelation-based methods for evaluating frequency probability. In particular, it can be observed that for any given chunk or line, a local probability maxima is often detected at multiples of the true note frequency.

The occurrence of multiple local probability maxima as shown in FIG. 11 can be understood as true octave errors, and are due to the periodic nature of the audio signal. To correct for this problem and in order to assign the appropriate probabilities, process 900 continues at 914 by further processing each monotonically increasing local maxima in order from lowest to highest frequency $\{0, f_0, f_1, \ldots, f_N\}$, and assigning them probabilities. Probabilities are advantageously assigned by making use of a mathematical process that gives preference to the original lowest frequency when the probabilities are similar, without over-penalizing frequencies that may have a peak undertone as long as the probability is significantly lower. An example of such a process is the integral of a Kumaraswamy distribution over the probability range, $\{0, f_0, f_1, \ldots, f_N\}$, as follows:

$$P(f_i) = \int_{x=f_i-1}^{f_i} 10x(1-x^2)^4$$

These probabilities are then quantized at 916 to their nearest notes on the western musical scale. For example, in some scenarios this quantization can be accomplished by linearly distributing the probability to the nearest note centers.

Another difficulty when detecting pitch in human singing is vibrato (notes sung with significantly oscillating pitch). Such vibrato type singing diffuses the note probability between adjacent notes, and can cause a single long note to appear as many oscillating nearby notes. The NT algorithm in process 900 can correct for this potential error at 918. The vibrato correction involves introducing a regularization factor to the edge weights 906, equal to a Laplace distribution $$l(x) = e^{\frac{|x|}{4}}.$$

At 920, to compute the final edge weights 906 between any two adjacent nodes i and j 902, we use every chunk from the j-th eighth note, and average the negative log likelihood of that node's pitch being the correct pitch for this note:

$$E(i, j) = \frac{1}{M} \sum_M -\log(l(f_i - f_j) * P(f_j))$$

where
i, j indicate two nodes in the graph,
M is the number of chunks,
$l(f_i-f_j)$ is the Laplace distribution applied to the difference in frequency of the nodes,
$P(f_j)$ is the note probability indicated above.
Edge weights connected to the source or sink node are not important in this case (all set to 1).
Intuitively, the edge weight equation balances the probability of each note in isolation based on just the eighth note's audio signal, with a regularization factor that prefers long uninterrupted notes over many quick back and forth notes, which is important in cases where a singer may be off-pitch and halfway between two options, or in cases of vibrato.

The process continues at 922 by inserting one or more "virtual note" nodes in the graph to represent periods of silence or the lack of any sung note. In other words, each eighth note can be assigned f=ø to indicate periods of silence or a lack of any actual note. The edge weight leading to each silent node is set to:

$$E(i, s) = \frac{1}{M} \sum_M \left(1 - \frac{\bar{c}}{10\bar{A}}\right)$$

where
i is any node and s is the silent "virtual note" node,
M is the number of chunks,
$\bar{c}$ is the average intensity of the audio signal in one chunk, and
$\bar{A}$ is the average intensity in the audio signal from the entire song.

This sets the edge weight based on how loud a chunk is compared to the average song loudness (quiet chunks are more likely to indicate a silent note). Note also that no vibrato correction is applied for silent notes.

At 924 the process continues by constructing the graph using for each node the musical notes identified in steps 908-922. The shortest path through this graph can be solved efficiently using conventional methods at 926. This solution will represent the optimal (highest probability) note selection, since the minimum sum of edge weights (i.e. shortest path) equals the highest product of probabilities:

$$\min(\Sigma - \log(P)) = -\Sigma \max(\log(P)) = -\log(\max(\Pi\, P))$$

The path determined in 926 can be converted at 928 into a sequence of eighth notes. According to one aspect, adjacent notes with the same pitch can be merged at 930 into larger notes (quarter, half notes, and so on). However, other solutions are also possible and it may be useful to consider changes at the edges of notes to determine whether to merge notes or leave them separated. The note transcription process can then terminate at 932 or can continue with other processing. The transcribed note data resulting from the process can be imported into the application along with the recorded singing track.

The systems described herein can comprise one or more components such as a processor, an application specific circuit, a programmable logic device, a digital signal processor, or other circuit programmed to perform the functions described herein. Embodiments can be realized in one computer system or several interconnected computer systems. Any kind of computer system or other apparatus adapted for carrying out the methods described herein is suited. A typical combination of hardware and software can be a general-purpose computer system. The general-purpose computer system can have a computer program that can control the computer system such that it carries out the methods described herein.

Embodiments of the inventive arrangements disclosed herein can be realized in one computer system. Alternative embodiments can be realized in several interconnected computer systems. Any kind of computer system or other apparatus adapted for carrying out the methods described herein is suited. A typical combination of hardware and software can be a general-purpose computer system. The general-purpose computer system can have a computer program that can control the computer system such that it carries out the methods described herein. A computer system as referenced herein can comprise various types of computing systems and devices, including a server computer, a personal computer (PC), a laptop computer, a desktop computer, a network router, switch or bridge, or any other device capable of executing a set of instructions (sequential or otherwise) that specifies actions to be taken by that device. In some scenarios, the user equipment can comprise a portable data communication device such as a smart phone, a tablet computer, or a laptop computer.

Figure 12:
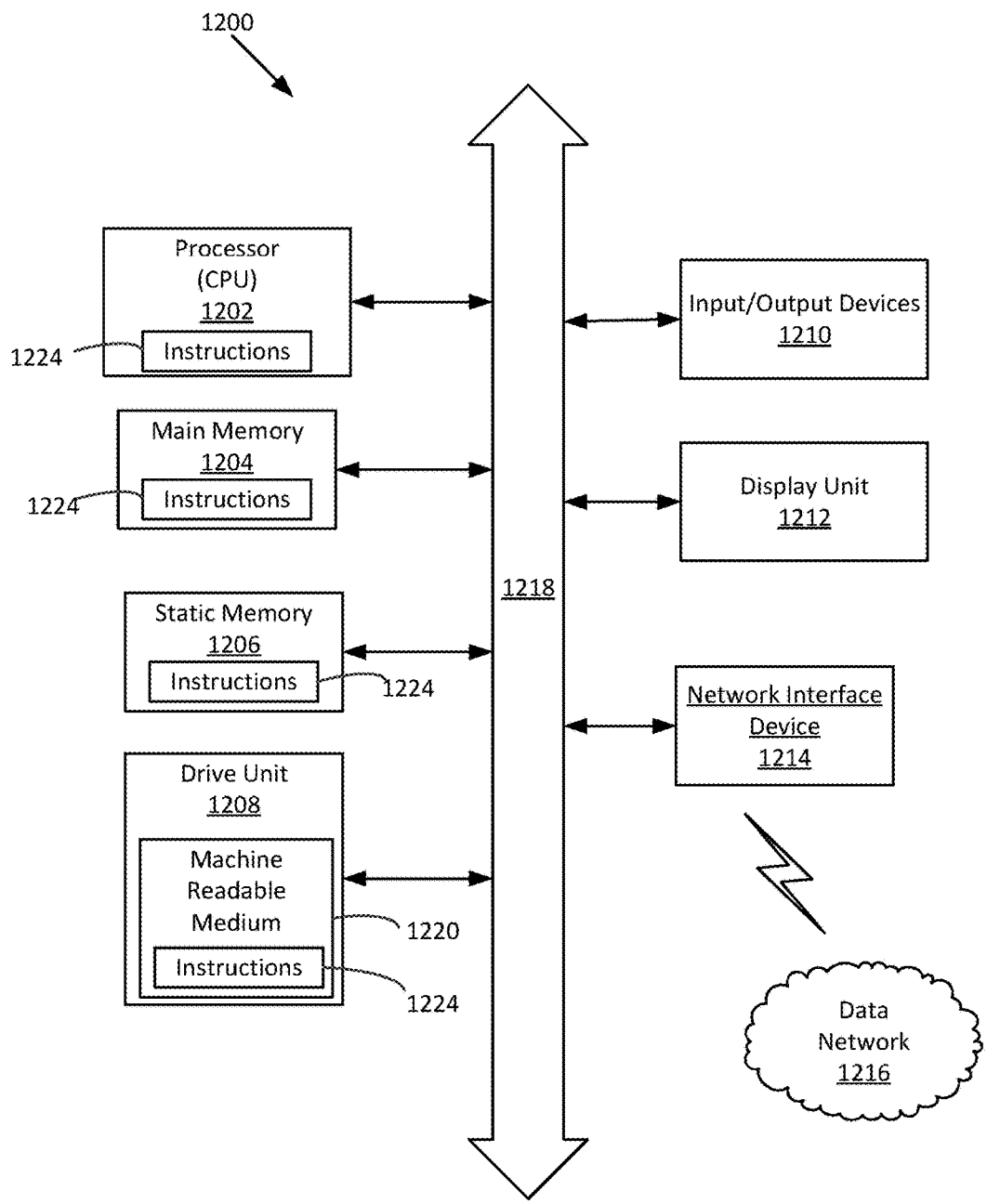
FIG. 12 is a block diagram of an exemplary computer system that can perform certain processing operations as described herein.

Referring now to FIG. 12, there is shown a hardware block diagram comprising a computer system 1200. The machine can include a set of instructions which are used to cause the computer system to perform any one or more of the methodologies discussed herein. In a networked deployment, the machine can function as a server, such as application server 102. In some scenarios, the exemplary computer system 1200 can correspond to each of the user equipment computer systems $106_1$-$106_n$. In some embodiments, the computer 1200 can operate independently as a standalone device. However, embodiments are not limited in this regard and in other scenarios the computer system can be operatively connected (networked) to other machines in a distributed environment to facilitate certain operations described herein. Accordingly, while only a single machine is illustrated it should be understood that embodiments can be taken to involve any collection of machines that individually or jointly execute one or more sets of instructions as described herein.

The computer system 1200 is comprised of a processor 1202 (e.g. a central processing unit or CPU), a main memory 1204, a static memory 1206, a drive unit 1208 for mass data storage and comprised of machine readable media 1220, input/output devices 1210, a display unit 1212 (e.g. a liquid crystal display (LCD), a solid state display, or a cathode ray tube (CRT)), and a network interface device 1214. Communications among these various components can be facilitated by means of a data bus 1218. One or more sets of instructions 1224 can be stored completely or partially in one or more of the main memory 1204, static memory 1206, and drive unit 1208. The instructions can also reside within the processor 1202 during execution thereof by the computer system. The input/output devices 1210 can include a keyboard, a mouse, a multi-touch surface (e.g. a touchscreen). The input/output devices can also include audio components such as microphones, loudspeakers, audio output jacks, and so on. The network interface device 1214 can be comprised of hardware components and software or firmware to facilitate wired or wireless network data communications in accordance with a network communication protocol utilized by a data network 100, 200.

The drive unit 1208 can comprise a machine readable medium 1220 on which is stored one or more sets of instructions 1224 (e.g. software) which are used to facilitate one or more of the methodologies and functions described herein. The term "machine-readable medium" shall be understood to include any tangible medium that is capable of storing instructions or data structures which facilitate any one or more of the methodologies of the present disclosure. Exemplary machine-readable media can include magnetic media, solid-state memories, optical-media and so on. More particularly, tangible media as described herein can include; magnetic disks; magneto-optical disks; CD-ROM disks and DVD-ROM disks, semiconductor memory devices, electrically erasable programmable read-only memory (EEPROM)) and flash memory devices. A tangible medium as described herein is one that is non-transitory insofar as it does not involve a propagating signal.

Embodiments disclosed herein can advantageously make use of well-known library functions such as OpenAL or AudioKit to facilitate reading and writing of MP3 files, and for handling audio input/output functions. These audio input/output functions can include for example microphone and speaker connectivity, volume adjustments, wireless networking functionality and so on).

Computer system 1200 should be understood to be one possible example of a computer system which can be used in connection with the various embodiments. However, the embodiments are not limited in this regard and any other suitable computer system architecture can also be used without limitation. Dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments may implement functions in two or more specific interconnected hardware modules or devices with related control and data signals communicated between and through the modules, or as portions of an application-specific integrated circuit. Thus, the exemplary system is applicable to software, firmware, and hardware implementations.

Further, it should be understood that embodiments can take the form of a computer program product on a tangible computer-usable storage medium (for example, a hard disk or a CD-ROM). The computer-usable storage medium can have computer-usable program code embodied in the medium. The term computer program product, as used herein, refers to a device comprised of all the features enabling the implementation of the methods described herein. Computer program, software application, computer software routine, and/or other variants of these terms, in the present context, mean any expression, in any language, code, or notation, of a set of instructions intended to cause a system having an information processing capability to perform a particular function either directly or after either or both of the following: a) conversion to another language, code, or notation; or b) reproduction in a different material form.

The MHT described herein advantageously combines qualitative self-assessment through hearing singer's voice with objective assessment through visualization of pitch, dynamics, and rhythm. It shows target notes and actual dynamics in an innovative way. It further allows for collaborative, asynchronous, virtual harmonizing via recording and track sharing. Multiple tracks of different formats can be synced with recorded tracks to allow seamless practicing in several modes and instant feedback. A pitch of each note that has been sung and the amplitude of each note can be updated at a rate which is selected to provide a smooth and accurate user experience with respect to note tracking and feedback. For example, in some scenarios, note updates can occur at a rate of every 18 ms (60 Hz) or 33 ms (30 Hz). Of course these values are merely provided as examples and are not intended to limit the range of note update frequency. The display format facilitates visualization of many aspects of the voice, with a particularly innovative treatment of the voice's amplitude (volume), a design challenge met with a volume meter (a perpendicular bar that runs horizontally along a note, with the left being lowest volume and the right being loudest).

The described features, advantages and characteristics of the various solutions disclosed herein can be combined in any suitable manner. One skilled in the relevant art will recognize, in light of the description herein, that the disclosed systems, devices and/or methods can be practiced without one or more of the specific features. In other instances, additional features and advantages may be recognized in certain scenarios that may not be present in all instances.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Although the various solutions have been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application. Thus, the breadth and scope of the disclosure herein should not be limited by any of the above descriptions. Rather, the scope of the invention should be defined in accordance with the following claims and their equivalents.

We claim:

1. A method for determining in real-time a pitch of voiced musical notes, comprising:
   using a microphone to convert sound waves, produced by a voiced rendition of one or more musical notes, to a time domain electronic audio signal;
   processing the electronic audio signal in an electronic processing device to determine a true pitch of the time domain electronic audio signal; and
   causing the electronic processing device to display in real-time, concurrent with the voiced rendition of each musical note, a pitch indicator on a display screen to convey to a user information concerning the true pitch which has been determined;
   wherein the true pitch is determined in the electronic processing device by
      segmenting the electronic audio signal into a plurality of audio signal samples;
      applying a constant-Q transform to the audio signal sample to convert the audio signal sample to a plurality of bins comprising frequency domain data, each said bin having a defined frequency range and specifying a detected power level of frequencies within the defined frequency range;
      identifying one or more local peaks associated with the detected power level of one or more of the bins at one or more frequencies, reducing potential octave errors caused by partial onsets and early onsets which are associated with the human voice by applying a corrective function which selectively adds energy to one or more of the local peaks, and
      selecting as the true pitch a frequency of the local peak having the largest power magnitude after the corrective function has been applied; and
   wherein the application of the corrective function comprises
      mathematically characterizing a distribution or shape of each of the one or more local peaks; and
      selectively adding energy to a first one of the local peaks when the distribution or shape of a second local peak associated with a partial onset is similar to the energy distribution of the first local peak.

2. The method according to claim 1, wherein the identifying of one or more local peaks, further comprises evaluating the bin values associated with a particular audio signal sample from lowest to highest frequency in progression.

3. The method according to claim 1, wherein the identifying further comprises selecting only those local peaks defined by one or more bins which exceed a power magnitude of previously identified local peaks by at least a minimum predetermined threshold.

4. The method according to claim 1, wherein the identifying further comprises selecting only those local peaks defined by one or more bins within a frequency range of human voice.

5. The method according to claim 1, further comprising using a bilateral filter to reduce common pitch tracking errors which occur at the beginning of voiced musical notes and around certain consonants when sung by a human.

6. The method according to claim 1, further comprising implementing the constant-Q transform with a set of parameters which are optimized for real-time detection of the pitch of a human voice.

7. The method according to claim 6, wherein a number of Fast Fourier Transform (FFT) bins per octave is set to 48.

8. The method according to claim 6, wherein a frequency to bandwidth ratio of a logarithmic filter used for the constant-Q transform is set to a value between 250 and 300 Hz.

9. The method according to claim 6, wherein the length of the audio signal sample is selected to have a value in the range from 30 ms to 60 ms.

10. The method according to claim 1, wherein the one or more musical notes comprise a first musical harmony part of a musical composition and the method further comprises causing the electronic processing device to display the one or more musical notes which are to be produced by the voiced rendition on a note grid.

11. The method according to claim 10, wherein the musical notes of the first musical harmony part and the pitch indicator for each musical note of the first musical harmony part are displayed on the note grid.

12. The method according to claim 10, wherein the musical composition is further comprised of at least a second musical harmony part, and wherein the electronic processing device is caused to further display on the note grid concurrent with the musical notes comprising the first musical harmony part, the musical notes which are associated with at least the second musical harmony part.

13. The method according to claim 12, wherein the second musical harmony part is caused by the electronic processing device to be audibly played through a loudspeaker concurrent with the voiced rendition of the first harmony part.

14. The method according to claim 10, wherein the musical notes which specify the first musical harmony part are automatically transcribed in at least a second electronic processing device, from a creative voice rendition of at least one of the first musical harmony part, and a data result of the automatic transcribing is subsequently imported into at least the first electronic processing device.

15. The method according to claim 14, further comprising performing the automatic transcribing using a note transcription algorithm that is distinct from the real-time pitch detection algorithm.

16. The method according to claim 15, wherein the note transcription algorithm determines the musical notes by determining a shortest path through a graph network.

17. The method according to claim 14, wherein the note transcription algorithm and the real-time pitch detection algorithm are the same device.

* * * * *